(12) United States Patent  (10) Patent No.: US 9,140,209 B2
Ernst et al.  (45) Date of Patent: Sep. 22, 2015

(54) RANKINE CYCLE WASTE HEAT RECOVERY SYSTEM

(71) Applicants: CUMMINS INC., Columbus, IN (US); PACCAR, INC., Bellevue, WA (US)

(72) Inventors: Timothy C. Ernst, Columbus, IN (US); Christopher R. Nelson, Columbus, IN (US)

(73) Assignee: CUMMINS INC., Columbus, IN (US)

( * ) Notice: Subject to any disclaimer, the term of this patent is extended or adjusted under 35 U.S.C. 154(b) by 172 days.

(21) Appl. No.: 13/679,885

(22) Filed: Nov. 16, 2012

(65) Prior Publication Data

US 2014/0137554 A1  May 22, 2014

(51) Int. Cl.
*F02G 3/00* (2006.01)
*F02G 5/04* (2006.01)
*F02M 25/07* (2006.01)
*F01N 5/02* (2006.01)

(52) U.S. Cl.
CPC .................. *F02G 5/04* (2013.01); *F02M 25/07* (2013.01); *F01N 5/02* (2013.01); *Y02T 10/121* (2013.01); *Y02T 10/166* (2013.01)

(58) Field of Classification Search
CPC ........... F01K 23/065; F01K 7/22; F02G 5/02; F02G 5/04; F02M 25/07; F02K 23/10; Y02T 10/121; Y02T 10/16; Y02T 10/166; F01N 5/02
USPC ................. 60/616, 597, 618, 670; 123/568.12
See application file for complete search history.

(56) References Cited

U.S. PATENT DOCUMENTS

| | | |
|---|---|---|
| 3,232,052 A | 2/1966 | Ricard |
| 3,789,804 A | 2/1974 | Aguet |
| 4,009,587 A | 3/1977 | Robinson, Jr. et al. |
| 4,164,850 A | 8/1979 | Lowi, Jr. |
| 4,204,401 A | 5/1980 | Earnest |
| 4,232,522 A | 11/1980 | Steiger |
| 4,267,692 A | 5/1981 | Earnest |
| 4,271,664 A | 6/1981 | Earnest |
| 4,428,190 A | 1/1984 | Bronicki |
| 4,458,493 A | 7/1984 | Amir et al. |
| 4,581,897 A | 4/1986 | Sankrithi |
| 4,630,572 A | 12/1986 | Evans |

(Continued)

FOREIGN PATENT DOCUMENTS

| | | |
|---|---|---|
| EP | 1 273 785 B1 | 5/2007 |
| JP | 60-222511 A | 11/1985 |

(Continued)

*Primary Examiner* — Thai Ba Trieu
*Assistant Examiner* — Jason T Newton
(74) *Attorney, Agent, or Firm* — Foley & Lardner LLP

(57) ABSTRACT

A waste heat recovery (WHR) system connects a working fluid to fluid passages formed in an engine block and/or a cylinder head of an internal combustion engine, forming an engine heat exchanger. The fluid passages are formed near high temperature areas of the engine, subjecting the working fluid to sufficient heat energy to vaporize the working fluid while the working fluid advantageously cools the engine block and/or cylinder head, improving fuel efficiency. The location of the engine heat exchanger downstream from an EGR boiler and upstream from an exhaust heat exchanger provides an optimal position of the engine heat exchanger with respect to the thermodynamic cycle of the WHR system, giving priority to cooling of EGR gas. The configuration of valves in the WHR system provides the ability to select a plurality of parallel flow paths for optimal operation.

17 Claims, 8 Drawing Sheets

(56) References Cited

U.S. PATENT DOCUMENTS

| | | | |
|---|---|---|---|
| 4,831,817 | A | 5/1989 | Linhardt |
| 4,873,829 | A | 10/1989 | Williamson |
| 4,911,110 | A | 3/1990 | Isoda et al. |
| 5,121,607 | A | 6/1992 | George, Jr. |
| 5,207,188 | A | 5/1993 | Hama et al. |
| 5,421,157 | A | 6/1995 | Rosenblatt |
| 5,649,513 | A | 7/1997 | Kanda |
| 5,685,152 | A | 11/1997 | Sterling |
| 5,771,868 | A | 6/1998 | Khair |
| 5,806,322 | A | 9/1998 | Cakmakci et al. |
| 5,915,472 | A | 6/1999 | Takikawa et al. |
| 5,950,425 | A | 9/1999 | Takahashi et al. |
| 6,014,856 | A | 1/2000 | Bronicki et al. |
| 6,035,643 | A | 3/2000 | Rosenblatt |
| 6,055,959 | A | 5/2000 | Taue |
| 6,138,649 | A | 10/2000 | Khair et al. |
| 6,244,256 | B1 * | 6/2001 | Wall et al. ............... 123/568.12 |
| 6,301,890 | B1 | 10/2001 | Zeretzke |
| 6,321,697 | B1 | 11/2001 | Matsuda et al. |
| 6,324,849 | B1 | 12/2001 | Togawa et al. |
| 6,393,840 | B1 | 5/2002 | Hay |
| 6,494,045 | B2 | 12/2002 | Rollins, III |
| 6,523,349 | B2 | 2/2003 | Viteri |
| 6,571,548 | B1 | 6/2003 | Bronicki et al. |
| 6,598,397 | B2 | 7/2003 | Hanna et al. |
| 6,606,848 | B1 | 8/2003 | Rollins, III |
| 6,637,207 | B2 | 10/2003 | Konezciny et al. |
| 6,701,712 | B2 | 3/2004 | Bronicki et al. |
| 6,715,296 | B2 | 4/2004 | Bakran et al. |
| 6,745,574 | B1 | 6/2004 | Dettmer |
| 6,748,934 | B2 | 6/2004 | Natkin et al. |
| 6,751,959 | B1 | 6/2004 | McClanahan et al. |
| 6,792,756 | B2 | 9/2004 | Bakran et al. |
| 6,810,668 | B2 | 11/2004 | Nagatani et al. |
| 6,817,185 | B2 | 11/2004 | Coney et al. |
| 6,848,259 | B2 | 2/2005 | Kelller-Sornig et al. |
| 6,877,323 | B2 | 4/2005 | Dewis |
| 6,880,344 | B2 | 4/2005 | Radcliff et al. |
| 6,910,333 | B2 | 6/2005 | Minemi et al. |
| 6,964,168 | B1 | 11/2005 | Pierson et al. |
| 6,977,983 | B2 | 12/2005 | Correia et al. |
| 6,986,251 | B2 | 1/2006 | Radcliff et al. |
| 7,007,487 | B2 | 3/2006 | Belokon et al. |
| 7,028,463 | B2 | 4/2006 | Hammond et al. |
| 7,044,210 | B2 | 5/2006 | Usui |
| 7,069,884 | B2 | 7/2006 | Baba et al. |
| 7,117,827 | B1 | 10/2006 | Hinderks |
| 7,121,906 | B2 | 10/2006 | Sundel |
| 7,131,259 | B2 | 11/2006 | Rollins, III |
| 7,131,290 | B2 | 11/2006 | Taniguchi et al. |
| 7,159,400 | B2 | 1/2007 | Tsutsui et al. |
| 7,174,716 | B2 | 2/2007 | Brasz et al. |
| 7,174,732 | B2 | 2/2007 | Taniguchi et al. |
| 7,191,740 | B2 | 3/2007 | Baba et al. |
| 7,200,996 | B2 | 4/2007 | Cogswell et al. |
| 7,225,621 | B2 | 6/2007 | Zimron et al. |
| 7,281,530 | B2 | 10/2007 | Usui |
| 7,325,401 | B1 | 2/2008 | Kesseli et al. |
| 7,340,897 | B2 | 3/2008 | Zimron et al. |
| 7,454,911 | B2 | 11/2008 | Tafas |
| 7,469,540 | B1 | 12/2008 | Knapton et al. |
| 7,578,139 | B2 | 8/2009 | Nishikawa et al. |
| 7,665,304 | B2 | 2/2010 | Sundel |
| 7,721,552 | B2 | 5/2010 | Hansson et al. |
| 7,797,940 | B2 | 9/2010 | Kaplan |
| 7,823,381 | B2 | 11/2010 | Misselhorn |
| 7,833,433 | B2 | 11/2010 | Singh et al. |
| 7,866,157 | B2 | 1/2011 | Ernst et al. |
| 7,942,001 | B2 | 5/2011 | Radcliff et al. |
| 7,958,873 | B2 | 6/2011 | Ernst et al. |
| 7,997,076 | B2 | 8/2011 | Ernst |
| 2002/0099476 | A1 | 7/2002 | Hamrin et al. |
| 2003/0033812 | A1 | 2/2003 | Gerdes et al. |
| 2003/0213245 | A1 | 11/2003 | Yates et al. |
| 2003/0213246 | A1 | 11/2003 | Coll et al. |
| 2003/0213248 | A1 | 11/2003 | Osborne et al. |
| 2005/0262842 | A1 | 12/2005 | Claassen et al. |
| 2008/0289313 | A1 | 11/2008 | Batscha et al. |
| 2009/0031724 | A1 | 2/2009 | Ruiz |
| 2009/0090109 | A1 | 4/2009 | Mills et al. |
| 2009/0121495 | A1 | 5/2009 | Mills |
| 2009/0133646 | A1 | 5/2009 | Wankhede et al. |
| 2009/0151356 | A1 | 6/2009 | Ast et al. |
| 2009/0179429 | A1 | 7/2009 | Ellis et al. |
| 2009/0211253 | A1 * | 8/2009 | Radcliff et al. ............. 60/670 |
| 2009/0260605 | A1 * | 10/2009 | Janssen et al. ............ 123/568.12 |
| 2009/0277173 | A1 | 11/2009 | Ernst et al. ................ 60/616 |
| 2009/0277429 | A1 * | 11/2009 | Marsh et al. .............. 123/568.12 |
| 2009/0277430 | A1 * | 11/2009 | Ernst et al. ............... 123/568.12 |
| 2009/0320477 | A1 | 12/2009 | Juchymenko |
| 2009/0322089 | A1 | 12/2009 | Mills et al. |
| 2010/0018207 | A1 | 1/2010 | Juchymenko |
| 2010/0071368 | A1 | 3/2010 | Kaplan et al. |
| 2010/0083919 | A1 | 4/2010 | Bucknell |
| 2010/0139626 | A1 | 6/2010 | Raab et al. |
| 2010/0180584 | A1 | 7/2010 | Berger et al. |
| 2010/0192569 | A1 | 8/2010 | Ambros et al. |
| 2010/0229525 | A1 | 9/2010 | Mackay et al. |
| 2010/0257858 | A1 | 10/2010 | Yaguchi et al. |
| 2010/0263380 | A1 | 10/2010 | Biederman et al. |
| 2010/0282221 | A1 | 11/2010 | Le Lievre |
| 2010/0288571 | A1 | 11/2010 | Dewis et al. |
| 2011/0005477 | A1 * | 1/2011 | Terashima et al. ......... 123/41.51 |
| 2011/0006523 | A1 | 1/2011 | Samuel |
| 2011/0094485 | A1 | 4/2011 | Vuk et al. |
| 2011/0209473 | A1 | 9/2011 | Fritz et al. |
| 2011/0308253 | A1 * | 12/2011 | Ritter ........................ 60/661 |
| 2012/0023946 | A1 * | 2/2012 | Ernst et al. ................ 60/660 |
| 2012/0036850 | A1 * | 2/2012 | Ernst et al. ................ 60/615 |
| 2012/0042650 | A1 * | 2/2012 | Ernst et al. ................ 60/615 |
| 2012/0192560 | A1 * | 8/2012 | Ernst et al. ................ 60/616 |
| 2012/0198839 | A1 * | 8/2012 | Nelson et al. .............. 60/605.1 |
| 2012/0210713 | A1 * | 8/2012 | Ernst et al. ................ 60/615 |
| 2012/0216763 | A1 * | 8/2012 | Barnes ....................... 123/41.44 |
| 2013/0199178 | A1 * | 8/2013 | Kanou et al. ............... 60/605.2 |

FOREIGN PATENT DOCUMENTS

| | | |
|---|---|---|
| JP | 8-68318 A | 3/1996 |
| JP | 9-32653 A | 2/1997 |
| JP | 10-238418 A | 9/1998 |
| JP | 11-166453 A | 6/1999 |
| JP | 2005-36787 A | 2/2005 |
| JP | 2005-42618 A | 2/2005 |
| JP | 2005-201067 A | 7/2005 |
| JP | 2005-329843 A | 12/2005 |
| JP | 2008-240613 A | 10/2008 |
| JP | 2009-167995 A | 7/2009 |
| JP | 2009-191647 A | 8/2009 |
| JP | 2010-77964 A | 4/2010 |
| JP | 2013238131 A * | 11/2013 |
| WO | 2009/098471 A2 | 8/2009 |
| WO | WO2012043335 * | 4/2012 ............. F02G 5/04 |
| WO | WO 2013028166 A2 * | 2/2013 |

\* cited by examiner

RANKINE CYCLE WASTE HEAT RECOVERY SYSTEM

STATEMENT REGARDING FEDERALLY SPONSORED RESEARCH OR DEVELOPMENT

This invention was made with government support under "Recovery ACT—System Level Demonstration of Highly Efficient and Clean, Diesel Powered Class 8 Trucks (Supertruck)," Program Award Number DE-EE0003403 awarded by the Department of Energy (DOE). The government has certain rights in the invention.

TECHNICAL FIELD

This disclosure relates to a waste heat recovery (WHR) system and method for regulating engine body and exhaust gas recirculation (EGR) cooling. More particularly, this disclosure relates to a Rankine cycle WHR system and method that enables transfer of heat directly from an engine body and/or an engine cylinder head to the Rankine cycle WHR system. The system includes a heat exchanger bypass arrangement to regulate EGR cooling for engine efficiency improvement and thermal management as well as a configuration to selectively connect a plurality of WHR elements to a feed pump of the WHR system.

BACKGROUND

Increasing the efficiency of internal combustion engines is critical to meet customer expectations and to meet an array of government-mandated regulations. Internal combustion engines generate significant amounts of heat that heat exchangers eventually transfer to the air surrounding the internal combustion engine. If a portion of the wasted heat were recovered by performing a necessary engine function, the efficiency of the internal combustion engine would be improved. However, there remain opportunities for improving the use of waste heat. For example, heat may be recovered directly from an engine body and/or cylinder head rather than indirectly. Such a system may require improvements in the ability to select the best source of heat to optimize heating and cooling throughout the systems of an internal combustion engine.

SUMMARY

This disclosure provides an internal combustion engine comprising an engine block, a cylinder head attached to the engine block, and a waste heat recovery system. The waste heat recovery system includes a waste heat recovery circuit containing a working fluid, a pump, an exhaust heat exchanger, and an energy conversion portion. The waste heat recovery circuit includes a plurality of waste heat recovery passages formed in at least one of the cylinder head and the engine block. The pump is positioned along the waste heat recovery circuit upstream from the plurality of waste heat recovery passages to deliver the working fluid through the waste heat recovery circuit. The exhaust heat exchanger is positioned along the waste heat recovery circuit downstream from the plurality of waste heat recovery passages and the exhaust heat exchanger is positioned to selectively receive an exhaust gas flowing through an exhaust system to an atmospheric vent. The energy conversion portion is positioned along the waste heat recovery circuit downstream from the plurality of waste heat recovery passages.

This disclosure also provides a waste heat recovery system for an internal combustion engine, the waste heat recovery system comprising a waste heat recovery circuit, a sub-cooler, a pump, an engine body, an exhaust heat exchanger, and a recuperator. The sub-cooler is positioned along the waste heat recovery circuit and is adapted to hold a working fluid. The pump is positioned along the waste heat recovery circuit downstream from the sub-cooler to deliver the working fluid through the waste heat recovery circuit. The engine body includes an engine heat exchanger positioned along the waste heat recovery circuit downstream from the pump. The exhaust heat exchanger is positioned along the waste heat recovery circuit downstream from the engine heat exchanger to selectively receive an exhaust gas flowing through an exhaust system to an atmospheric vent. The recuperator is positioned along the waste heat recovery circuit downstream from the pump and upstream from the engine heat exchanger.

This disclosure also provides a waste heat recovery system for an internal combustion engine, comprising a sub-cooler containing a working fluid, a receiver, an EGR boiler, an engine body including an engine heat exchanger, a waste heat recovery circuit, a pump, and a valve mechanism. The waste heat recovery circuit includes a first flow path portion, a second flow path portion, a third flow path portion, and a fourth flow path portion. The pump is positioned along the waste heat recovery circuit downstream from the sub-cooler to deliver the working fluid through the waste heat recovery circuit. The valve mechanism is operable to connect the pump to the sub-cooler along the first flow path portion, to connect the pump to the receiver along the second flow path portion, to connect the pump to the EGR boiler along the third flow path portion, and to connect the pump to the engine heat exchanger along the fourth flow path portion.

Advantages and features of the embodiments of this disclosure will become more apparent from the following detailed description of exemplary embodiments when viewed in conjunction with the accompanying drawings.

DETAILED DESCRIPTION

Figure 1:
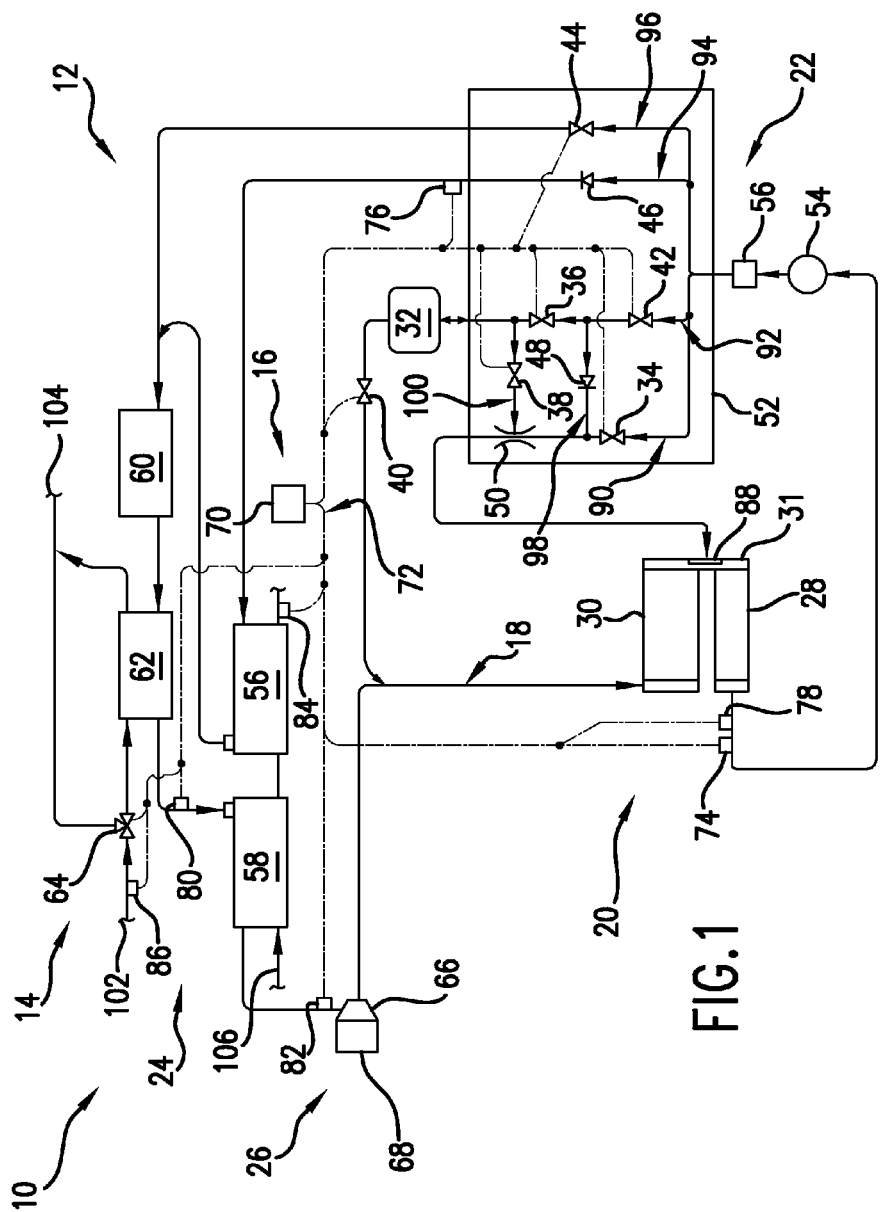
FIG. 1 is a schematic of a first exemplary embodiment of the present disclosure.
Figure 2:
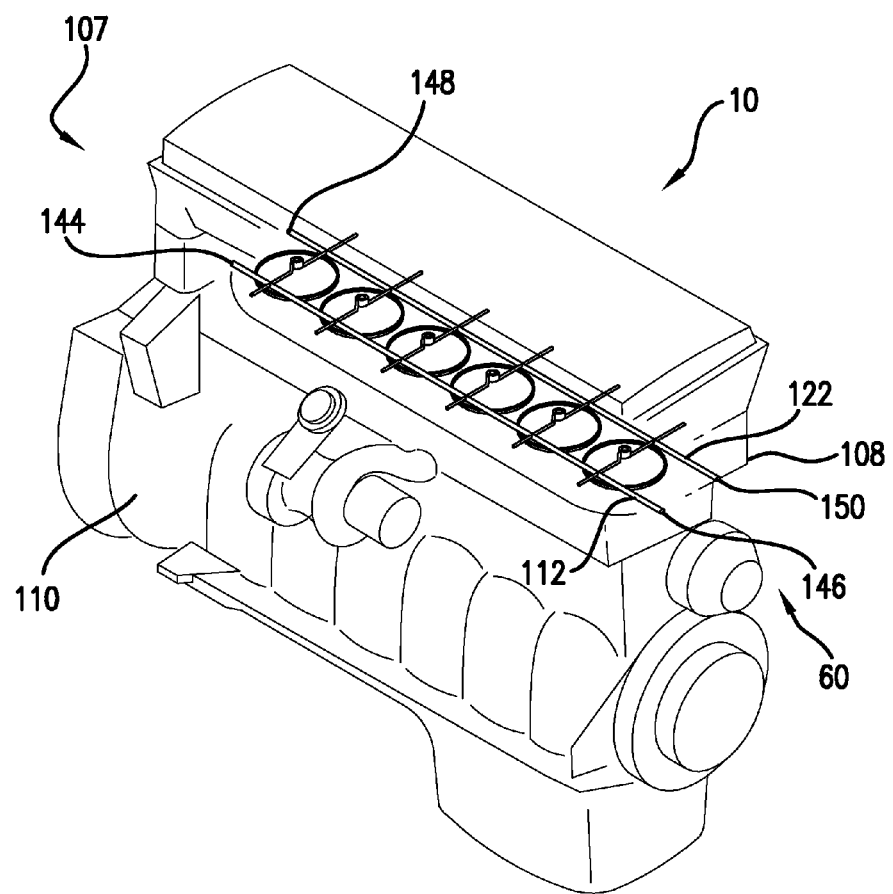
FIG. 2 is a perspective view of an engine body of the first exemplary embodiment of the present disclosure overlaid with fluid passages that are part of the WHR system.
Figure 3:
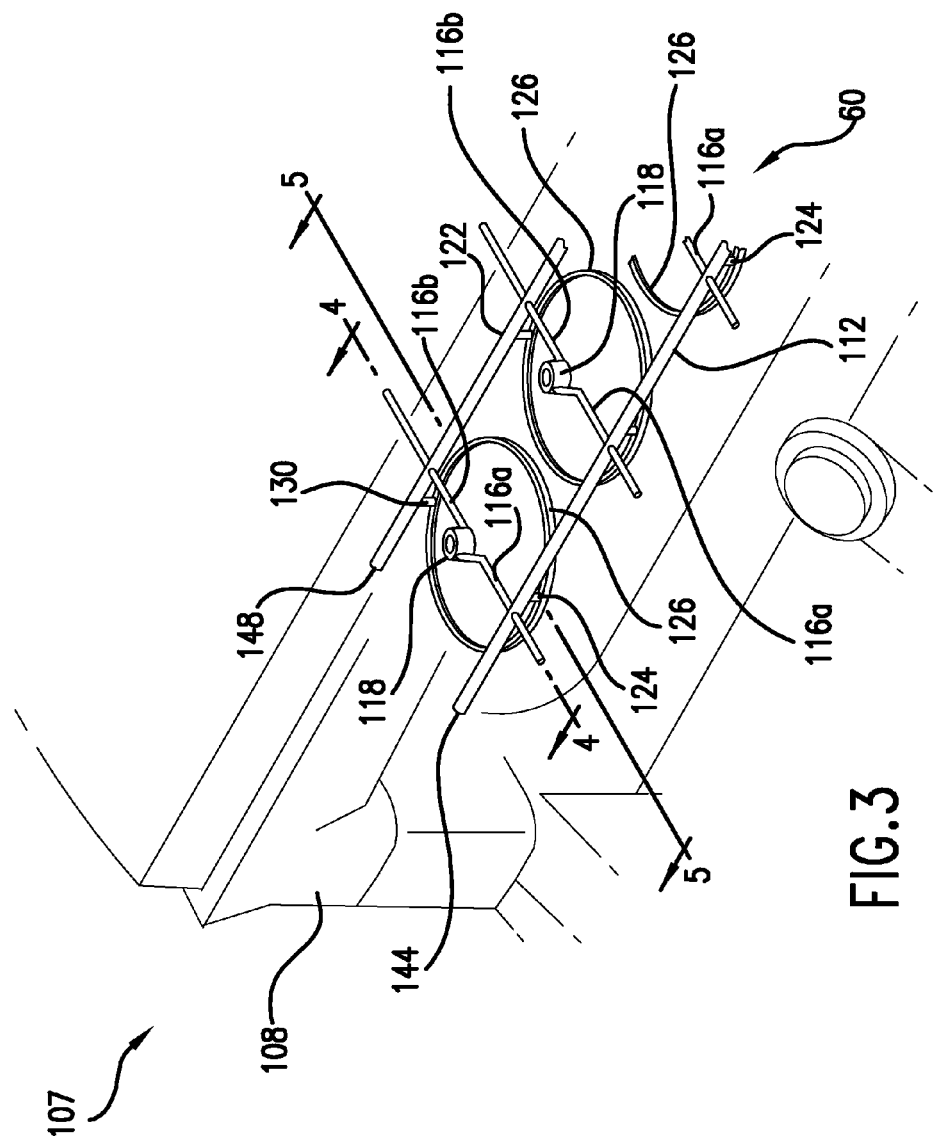
FIG. 3 is a view of a portion of the engine body of FIG. 2.
Figure 4:
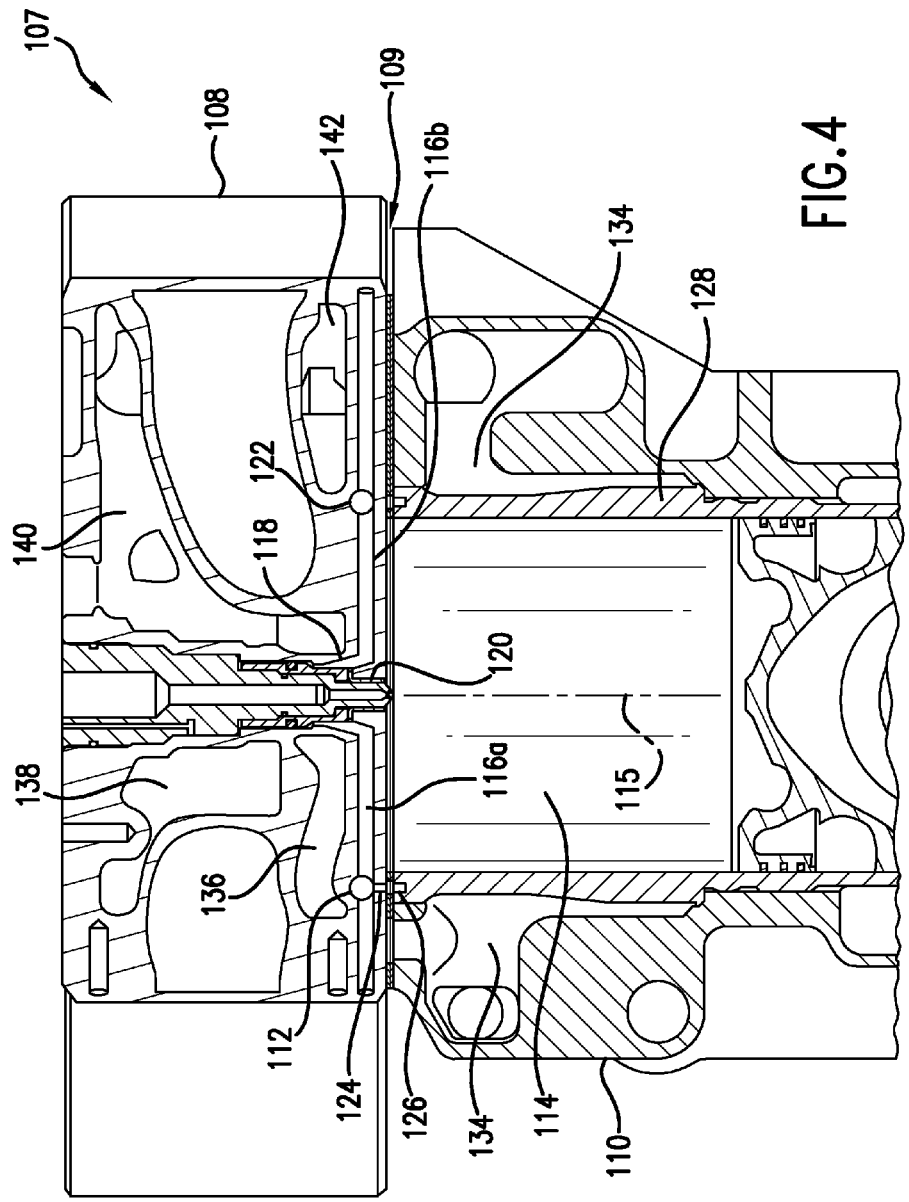
FIG. 4 is a sectional view of a portion of the engine body of FIG. 3 along the lines 4-4.
Figure 5:
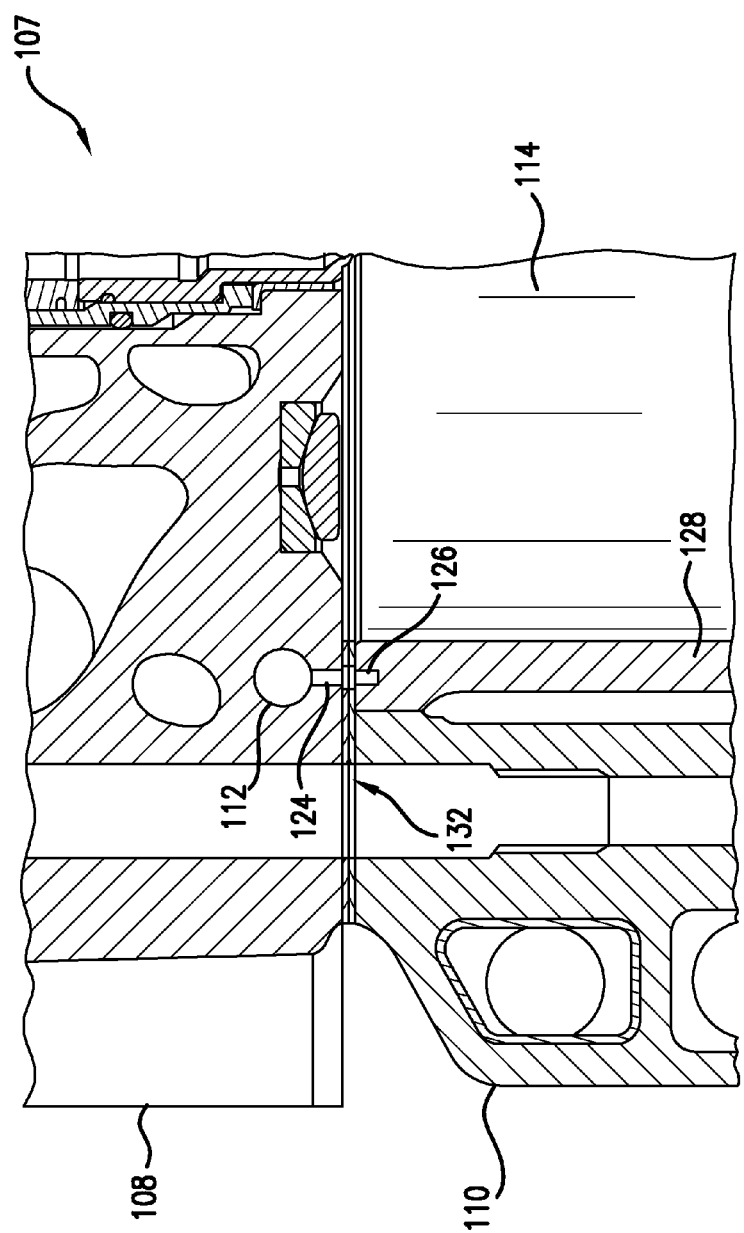
FIG. 5 is a sectional view of a portion of the engine body of FIG. 3 along the lines 5-5.

Referring now to FIG. 1, a portion of an internal combustion engine in accordance with a first exemplary embodiment of the present disclosure is shown as a schematic and generally indicated at 10. Engine 10 includes a waste heat recovery (WHR) system 12, a portion of an exhaust system 14, and a control system 16. WHR system 12 includes a WHR circuit

18, along which are positioned a fluid management portion 20, a fluid control portion 22, a heat exchange portion 24, and an energy conversion portion 26. Fluid management portion 20 provides containment and cooling for a liquid working fluid of WHR system 12. Fluid control portion 22 regulates the flow of the working fluid throughout WHR system 12. Heat exchange portion 24 provides cooling to certain systems of engine 10 and serves to heat the working fluid to permit the working fluid to drive energy conversion portion 26, extracting useful work or energy from waste heat created by engine 10.

Engine 10 includes various features to improve the transfer of heat to WHR system 12. WHR system 12 receives heat directly from an engine body and/or a cylinder head of engine 10. The heat received by WHR system 12 directly from an engine heat exchanger or cooler positioned within the engine body and/or the cylinder head is of sufficient quality, i.e., temperature, that the heat is capable of vaporizing liquid working fluid. Additionally, the placement of an EGR boiler ahead of the engine heat exchanger or cooler enables cooling of EGR gases while raising the temperature of the working fluid. The high quality cooling of EGR gas and heating of the working fluid in the EGR boiler is performed ahead of optional cooling of gas flowing through exhaust system 14. WHR system 12 also includes a novel valve configuration that offers improved ability to control the flow of working fluid throughout WHR system 12.

Fluid management portion 20 includes a sub-cooler 28, a condenser 30, a receiver 32, and a feed pump 54. Receiver 32 serves primarily as a reservoir for WHR system 12. Condenser 30 serves to convert gaseous working fluid to liquid working fluid. Sub-cooler 28 provides cooling to the liquid working fluid. Condenser 30 may be integral with sub-cooler 28, may connect to sub-cooler 28 by way of WHR circuit 18, or may be commonly mounted with sub-cooler 28 on a common base 31, which may include a plurality of fluid flow paths (not shown) to fluidly connect condenser 30 to sub-cooler 28. Receiver 32 may be physically elevated higher than sub-cooler 28, and may be connected to sub-cooler 28 through fluid control portion 22. The top of receiver 32 includes a vent that may be opened to condenser 30 by way of a vent valve 40. A fluid level sensor 88 is positioned in a location suitable to determine the level of liquid working fluid in sub-cooler 28 and condenser 30. In the exemplary embodiment, fluid level sensor 88 is positioned on common base 31. Feed pump 54 is positioned along WHR circuit 18 downstream from sub-cooler 28 and upstream from fluid control portion 22. Fluid management portion 20 may also include a filter drier 56 positioned along WHR circuit 18 downstream from feed pump 54 and upstream from fluid control portion 22.

Fluid control portion 22 includes a plurality of valves and an ejector 50 configured to regulate flow as needed throughout WHR system 12. Some of the valves receive signals from control system 16 and others are passive valves. The valves include electrically actuated on-off valves 34, 36, 38, electrically actuated proportional valves 42 and 44, electrically actuated vent valve 40, and passive check valves 46 and 48. Ejector 50 is also a passive device and operates in conjunction with certain valves to draw liquid working fluid from receiver 32. Many of the valves and ejector 50 may be included within a valve module 52. The function of the various valves and ejector 50 is to control the flow of working fluid in WHR system 12, which also controls the heat transferred to and from the working fluid flowing through WHR circuit 18. Though electrically actuated valves 34, 36, 38, 40, 42, and 44 may be described as on-off or proportional valves, this description is for convenience in the context of the exemplary embodiment. The on-off valves may be proportional valves and the proportional valves may be modulated valves capable of opening and closing rapidly to adjust the amount of working fluid flowing through the valves.

Heat exchange portion 24 includes an EGR boiler 56, an EGR superheater 58, an engine heat exchanger 60, an exhaust heat exchanger 62, and an exhaust control valve 64. EGR boiler 56 provides the ability to regulate the temperature of an EGR gas by transferring heat to the working fluid. It should be understood that the term EGR boiler is used for the sake of convenience. EGR boiler 56 serves more than one function in engine 10 and in the engines of the embodiments described hereinbelow, serving to cool EGR gas and to transfer heat from the EGR gas to the working fluid of WHR system 12. Engine heat exchanger 60 is positioned internally within an engine body and/or a cylinder head of engine 10, permitting direct transfer of heat from within the engine body and/or cylinder head to the working fluid. Exhaust heat exchanger 62 permits the controlled transfer of heat from engine exhaust gas to the working fluid. The amount of heat available to exhaust heat exchanger 62 is determined by exhaust control valve 64. EGR superheater 58 provides additional heat energy to the working fluid, which is in a gaseous state when it enters EGR superheater 58.

Energy conversion portion 26 includes an energy conversion device 66 and may include an auxiliary unit 68. Energy conversion portion 26 is capable of producing additional work or transferring energy to another device or system. For example, energy conversion portion 26 may be a turbine, piston, scroll, screw, or other type of expander device that moves, e.g., rotates, as a result of expanding working fluid vapor to provide additional work. The additional work can be fed in the engine's driveline to supplement the engine's power either mechanically or electrically (e.g., by turning a generator), or it can be used to drive a generator and power electrical devices, parasitic, or a storage battery (not shown). Alternatively, energy conversion portion 26 can be used to transfer energy from one system to another system (e.g., to transfer heat energy from WHR system 12 to a fluid for a heating system. Auxiliary unit 68 may be part of a generator. If auxiliary unit 68 is a generator, it may feed a motor generator that may be part of a hybrid drive system.

Control system 16 may include a control module 70 and a wire harness 72. Control system 16 may also include a first pressure sensor 74, which may be used to assist in determining whether sub-cooling of the working fluid in sub-cooler 28 is adequate, and a second pressure sensor 76, which is used to measure high side pressure along WHR circuit 18 downstream from feed pump 54 and upstream from engine heat exchanger 60. Second pressure sensor 76 is positioned in the location shown in FIG. 1 because the temperature of the working fluid at that location is significantly lower than at other locations downstream of the various heat exchangers positioned along WHR circuit 18. Keeping second pressure sensor 76 in a cooler location is more suitable for the packaging and durability of second pressure sensor 76. Control system 16 may also include fluid level sensor 88 positioned to measure the level of liquid working fluid in sub-cooler 28 and condenser 30. Control system 16 may use signals from fluid level sensor 88 to determine whether additional liquid working fluid should be added to sub-cooler 28 and condenser 30.

Control system 16 may also include a plurality of temperatures sensors, such as temperature sensors 78, 80, 82, 84, and 86. Signals from first temperature sensor 78 may be used in conjunction with signals from first pressure sensor 74 to assist in determining whether sub-cooling of the working fluid is adequate. Second temperature sensor 80 provides signals to control system 16 that indicates the amount of heat that has been transferred to the working fluid by engine heat exchanger 60, exhaust heat exchanger 62, and EGR boiler 56. Signals from third temperature sensor 82 in conjunction with signals from second pressure sensor 76 are used to estimate the amount heat that has been transferred to the working fluid from EGR superheater 58, which is an estimate of superheating of the working fluid at the inlet to energy conversion device 66.

Control system 16 may use signals indicative of the temperature of the working fluid from second temperature sensor 80 and third temperature sensor 82 to increase or decrease the heat transferred to the working fluid. Fourth temperature sensor 84 provides signals to control system 16 indicative of the temperature of EGR gas exiting EGR boiler 56. Control system 16 may use the signals from fourth temperature sensor 84 to increase or decrease heat transfer to the working fluid to vary cooling of the EGR gas. Signals from fifth temperature sensor 86 to control system 16 indicate the temperature of exhaust gas flowing toward exhaust heat exchanger 62. Control system 16 may use the temperature signals from fifth temperature sensor 86 in conjunction with information from second temperature sensor 80 and third temperature sensor 82 to determine the amount of exhaust gas needed to flow through exhaust heat exchanger 62 to heat the working fluid.

Control module 70 may be an electronic control unit or electronic control module (ECM) that monitors the performance of WHR system 12 or may monitor other conditions of engine 10 or an associated vehicle in which WHR system 12 may be located. Control module 70 may be a single processor, a distributed processor, an electronic equivalent of a processor, or any combination of the aforementioned elements, as well as software, electronic storage, fixed lookup tables and the like. Control module 70 may include a digital or analog circuit. Control module 70 may connect to certain components of engine 10 by wire harness 72, though such connection may be by other means, including a wireless system. For example, control module 70 may connect to and provide control signals to on-off valve 34, on-off valve 36, on-off valve 38, vent valve 40, proportional valve 42, proportional valve 44, and exhaust control valve 64.

The system described thus far is a Rankine cycle waste heat recovery system or an organic Rankine cycle if the working fluid is an organic high molecular mass fluid with a liquid-vapor phase change that is lower than the water-steam phase change. Examples of Rankine cycle working fluids, organic and inorganic, include Genetron® R-245fa from Honeywell, Therminol®, Dowtherm J™ from Dow Chemical Co., Fluorinol® from American Nickeloid, toluene, dodecane, isododecane, methylundecane, neopentane, neopentane, octane, water/methanol mixtures, or steam.

The location of the aforementioned elements is arranged to obtain the benefits of the present disclosure. Condenser 30 is positioned along WHR circuit 18, upstream from sub-cooler 28 and downstream from energy conversion portion 26. As previously noted, condenser 30 may be positioned or located on base plate or common base 31, to which sub-cooler 28 may also be attached. Feed pump 54 is positioned along WHR circuit 18 downstream from sub-cooler 28 and upstream from valve module 52. First pressure sensor 74 and first temperature sensor 78 are positioned along WHR circuit 18 between sub-cooler 28 and feed pump 54. Filter drier 56 may be positioned along WHR circuit 18 downstream from feed pump 54 and upstream from valve module 52 of fluid control portion 22.

Fluid control portion 22 may include a plurality of parallel flow path portions formed along WHR circuit 18 that connect feed pump 54 to various elements of WHR system 12. A first flow path portion 90 connects the downstream side of feed pump 54 to sub-cooler 28 and condenser 30. Positioned along first flow path portion 90 downstream from feed pump 54 is on-off valve 34. Downstream from on-off valve 34 is ejector 50.

A second flow path portion 92, which is parallel to first flow path portion 90, connects feed pump 54 to receiver 32. Proportional valve 42 is positioned along second flow path portion 92 downstream from feed pump 54. On-off valve 36 is positioned along second flow path portion 92 between proportional valve 42 and receiver 32. Second flow path portion 92 is connected to first flow path portion 90 along a first connection portion 98 and a second connection portion 100. Passive check valve 48 is positioned along first connection portion 98, which connects to second flow path portion 92 in a location between proportional valve 42 and on-off valve 36, and which connects to first flow path portion 90 in a location between on-off valve 34 and ejector 50. On-off valve 38 is positioned along second connection portion 100, which connects to second flow path portion 92 in a location between on-off valve 36 and receiver 32, and which connects to ejector 50, positioned along first flow path portion 90. Though not part of second flow path portion 92, vent valve 40 is positioned along WHR circuit 18 between receiver 32 and condenser 30. The purpose of vent valve 40 is to permit vapor to move into and out from receiver 32 as liquid working fluid is moved out from and into receiver 32 along second flow path portion 92.

A third flow path portion 94, which is parallel to first flow path portion 90 and to second flow path portion 92, connects feed pump 54 to EGR boiler 56. Passive check valve 46 is positioned along third flow path portion 94, between feed pump 54 and EGR boiler 56. EGR boiler 56 is connected to engine heat exchanger 60. Second pressure sensor 76 is positioned along third flow path portion 94 between passive check valve 46 and EGR boiler 56.

A fourth flow path portion 96, which is parallel to first flow path 90, second flow path portion 92, and third flow path portion 94, connects feed pump 54 to engine heat exchanger 60, thus converging with any flow of working fluid from third flow path portion 94. Proportional valve 44 is positioned along fourth flow path portion 96 downstream from feed pump 54 and upstream from engine heat exchanger 60.

EGR superheater 58 is positioned along WHR circuit 18 downstream from engine heat exchanger 60 and upstream from condenser 30. Exhaust heat exchanger 62 is positioned along WHR circuit 18 between engine heat exchanger 60 and EGR superheater 58. Second temperature sensor 80 is positioned along WHR circuit 18 between exhaust heat exchanger 62 and EGR superheater 58. Energy conversion device 66 is positioned along WHR circuit 18 downstream from EGR superheater 58 and upstream from condenser 30. Third temperature sensor 82 is positioned along WHR circuit 18 between EGR superheater 58 and energy conversion device 66.

Exhaust heat exchanger 62 is connected to an upstream aftertreatment system 102 and exhaust control valve 64 is positioned between aftertreatment system 102 and exhaust heat exchanger 62. Both exhaust control valve 64 and exhaust heat exchanger 62 are connected on their downstream sides to an atmospheric vent 104, which may be a tailpipe, exhaust pipe, exhaust stack, or the like. Fifth temperature sensor 86 is positioned along exhaust system 14, upstream from exhaust control valve 64.

EGR superheater 58 and EGR boiler 56 are connected to a portion of an EGR circuit 106. EGR gas flows into EGR superheater 58 and then downstream from EGR superheater 58 into EGR boiler 56. From EGR boiler 56, EGR gas flows downstream along EGR circuit 106. EGR superheater 58 and EGR boiler 56 serve as heat exchangers for EGR circuit 106, providing a cooling function to the EGR gas flowing through EGR superheater 58 and EGR boiler 56. EGR superheater 58 and EGR boiler 56 also serve as heat exchangers for WHR circuit 18, raising the temperature of working fluid flowing through EGR boiler 56 and through EGR superheater 58. Fourth temperature sensor 84 is positioned along EGR circuit 106 downstream from EGR boiler 56.

WHR system 12 operates as follows. Sub-cooler 28 stores liquid working fluid. An engine 10 belt (not shown), crankshaft (not shown), gear drive with a clutch connection (not shown), or an electric motor (not shown) drives feed pump 54. Feed pump 54 pulls or draws liquid working fluid from sub-cooler 28. Feed pump 54 then forces liquid working fluid downstream to valve module 52. In valve module 52, the flow of liquid working fluid may be directed to one of four parallel flow path portions, as directed by control system 16 by way of the valves in valve module 52. First flow path portion 90 connects feed pump 54 to sub-cooler 28. Second flow path portion 92 connects feed pump 54 to receiver 32. Third flow path portion 94 connects feed pump 54 to EGR boiler 56. Fourth flow path portion 96 connects feed pump 54 to engine heat exchanger 60.

Liquid working fluid flows along first flow path portion 90 at approximately 17.5 gallons per minute (gpm) at about 15 pounds per square inch differential (psid) when control system 16 sends a command to on-off valve 34 to open. The liquid working fluid flows through ejector 50 and then downstream to condenser 28. On-off valve 34 is normally closed during operation of engine 10. However, on-off valve 34 may be opened by control system 16 during start and high idle conditions of engine 10 to limit flow through EGR boiler 56 and engine heat exchanger 60, when such may be desirable.

Liquid working fluid may flow along second flow path portion 92 for several reasons. During normal operation of engine 10, proportional valve 42 is at least partially open to permit liquid working fluid to flow along first connection portion 98 through check valve 48, which may have a cracking or opening pressure of 5 psid, so that liquid working fluid flows to sub-cooler 28, thus forming a continuous loop of flowing liquid working fluid when check valve 48 opens. The amount of liquid working fluid that flows through proportional valve 42 is determined by the amount of liquid working fluid required through third flow path portion 94 and fourth flow path portion 96. If on-off valve 34 and proportional valve 42 are simultaneously opened, liquid working fluid flows through first flow path portion 90 and partially along second flow path portion 92, which may be used to prevent two-phase working fluid flow, i.e., liquid and gas, from reaching energy conversion portion 26. If on-off valve 36 is opened when proportional valve 42 is opened, on-off valve 34 is closed, on-off valve 38 is closed, and vent valve 40 is opened, the cracking pressure of check valve 48 causes liquid working fluid to flow upwardly along second flow path portion 92 to receiver 32. The flow of fluid into receiver 32 causes the level of liquid working fluid in receiver 32 to increase. Thus, in this valve configuration feed pump 54 may be connected simultaneously to sub-cooler 28 and to receiver 32.

If on-off valve 38 is open, on-off valve 36 is closed, and vent valve 40 is open while liquid working fluid flows from feed pump 54 along first flow path portion 90, then receiver 32 is connected along a parallel portion of WHR circuit 18 to feed pump 54. In this valve configuration, liquid working fluid will be drawn from receiver 32. The liquid working fluid flows through a portion of second flow path portion 92 and through on-off valve 38, which is positioned along second connection portion 100, into ejector 50. The liquid working fluid then flows downstream from ejector 50 to sub-cooler 28 and condenser 30, increasing the level of liquid working fluid in sub-cooler 28 or in condenser 30, which may contain some liquid working fluid. The increase in the level of the liquid working fluid in sub-cooler 28 increases sub-cooling, adjusting the saturation temperature of the liquid working fluid. Vent valve 40 is normally open during operation of engine 10, which permits vapor to flow to and from the top portion of receiver 32 to and from a top portion of condenser 30, permitting the level of liquid working fluid in receiver 32 to increase or decrease. Once the level of liquid working fluid has been increased in sub-cooler 28 and/or condenser 30 a desirable amount, on-off valve 34 and on-off valve 38 are closed, stopping flow from receiver 32 through second connection portion 100.

Liquid working fluid flows along third flow path portion 94 based on the opening of proportional valve 44 positioned along fourth flow path portion 96. Passive check valve 46 creates a backpressure along the upstream portion of third flow path portion 94, which biases the flow of liquid working fluid along fourth flow path portion 96. By partially closing proportional valve 44, the backpressure along the upstream portion of fourth flow path portion 96 increases, until passive check valve 46 cracks or opens under the increased backpressure from proportional valve 44. Relatively small amounts of liquid working fluid normally flow through first flow path portion 90 and second flow path portion 92, so most of the liquid working fluid provided to WHR circuit 18 by feed pump 54 flows through third flow path portion 94 and fourth flow path portion 96.

Control system 16 receives signals from second temperature sensor 80 indicative of the temperature of the working fluid prior to entering EGR superheater 58. If the temperature of the working fluid is insufficient for a desired level of superheating by EGR superheater 58, control system 16 may send a control signal to proportional valve 44 to decrease flow through fourth flow path portion 96, which increases flow through third flow path portion 94 to EGR boiler 56. The increase in the flow of working fluid through EGR boiler 56 causes an increase in heat transfer from EGR system 106 to the working fluid. Control system 16 may also receive temperature signals from third temperature sensor 82 indicative of the amount of superheating of the working fluid, which control system 16 may use to adjust the flow of liquid working fluid through third flow path portion 94 and fourth flow path portion 96. Control system 16 may also receive temperature signals from fourth temperature sensor 84 indicative of the temperature of EGR gas. Because cooling of EGR gas in EGR circuit 106 relates to emissions of engine 10, control system 16 may increase or decrease the flow of working fluid through third flow path portion 94 to increase or decrease cooling of EGR gas to optimize engine emissions.

Flow of working fluid through third flow path portion 94 and fourth flow path portion 96 converges upstream from engine heat exchanger 60. At engine heat exchanger 60, heat is transferred directly from an engine body and/or an engine cylinder head directly to the working fluid, described in more detail hereinbelow. From the engine heat exchanger 60, the working fluid flows to exhaust heat exchanger 62. Control system 16 is able to selectively direct heat to exhaust heat exchanger 62 by sending control signals to exhaust control valve 64, depending on the temperature signals control system 16 receives from second temperature sensor 80 and third temperature sensor 82, and the temperature of exhaust gases, which is indicated by signals from fifth temperature sensor 86. Any exhaust gas that does not flow into exhaust heat exchanger 62 flows around exhaust heat exchanger 62 directly to atmospheric vent 104. Thus, exhaust heat exchanger 62 selectively receives exhaust gas flowing through exhaust system 14 to atmospheric vent 104.

The working fluid, which is in a gaseous state because of heat transfer from the above-described heat exchangers, flows into EGR superheater 58, where additional heat energy is added to the gaseous working fluid. The superheated gaseous working fluid flows into energy conversion device 66.

The placement of engine heat exchanger 60 is beneficial from a thermodynamic cycle perspective. The heat from engine heat exchanger 60 is of sufficient quality or temperature to convert the liquid working fluid to vapor, which is a phase change of the working fluid, while performing a necessary engine function, the cooling of the engine body and/or the cylinder head. Cooling of exhaust gas in exhaust heat exchanger 62 is an optional function that may be reduced in favor of cooling of EGR gas in EGR boiler 56 and cooling of engine 10 in engine heat exchanger 60. Thus, the configuration of these components is advantageous in providing priority cooling to EGR gas, then the engine body and/or cylinder head in engine heat exchanger 60. Additional heat may then be added as needed in exhaust heat exchanger 62 and EGR superheater 58 by WHR system 12 to obtain optimal superheating of the working fluid.

High-pressure energy conversion device 66 may drive auxiliary unit 68. Auxiliary unit 68 can channel mechanical energy into the driveline (not shown) of engine 10 or can generate electrical energy to power electrical devices or for storage in one or more batteries. If auxiliary unit 68 is an electrical generator, the power could power a driveline motor generator (not shown) by way of power electronics (not shown) to help drive a vehicle (not shown) in which engine 10 is mounted. As the superheated gaseous working fluid flows through energy conversion device 66, the pressure and temperature of the gaseous working fluid decreases significantly prior to flowing into condenser 30. The decrease in temperature and pressure begin the condensation process, which continues in condenser 30. The working fluid, now in a liquid state, flows to sub-cooler 28, and the process begins again.

As noted hereinabove, and in the embodiments described hereinbelow, heat is directly transferred from an engine body and/or a cylinder head of engine 10, which increases the efficiency of heat transfer and can improve cooling of the engine body and/or the cylinder head. One such engine configuration is shown in published U.S. patent application Ser. No. 13/407,647, the entire content of which is hereby incorporated by reference.

Referring to FIGS. 2-5, an exemplary embodiment engine body and a cylinder head of the present disclosure containing an engine heat exchanger 60 capable of permitting the transfer of heat to the working fluid is shown. Engine 10 includes an engine body 107. Engine body 107 includes an engine block 110 and a cylinder head 108 attached to engine block 110.

The working fluid from WHR circuit 18 flows into cylinder head 108 along a first WHR manifold passage 112. First WHR manifold passage 112 is positioned longitudinally along one side of a plurality of cylinders 114 formed in engine block 110. Each cylinder 114 includes a cylinder axis 115. For the purposes of the following discussion, axial or axially is in a direction that is parallel to cylinder axis 115. Longitudinally is in a direction along the length of engine body 107, which is the direction WHR manifold passage 112 extends. A transverse direction is perpendicular to the longitudinal direction and to the axial direction across the width of engine body 107.

A WHR passage 116a extending transversely to engine block 110 and generally perpendicular to first WHR manifold passage 112 connects first WHR manifold passage 112 to an annular passage portion 118 located adjacent or proximate to a fuel injector bore 120. A WHR passage 116b connects annular passage portion 118 to a second WHR manifold passage 122, which may be parallel to first WHR manifold passage 112. During combustion, annular passage portion 118 receives significant heat transfer from a fuel injector located in fuel injector bore 120. A first passage 124 may extend axially from first WHR manifold passage 112 to an annular WHR passage or groove 126 formed in the top of a cylinder liner 128. Annular groove 126 may connect to second WHR manifold passage 122 by a second passage 130 that extends axially into cylinder head 108 to intersect second WHR manifold passage 122. A dual cylinder head gasket 132 or other sealing device seals first passage 124, annular groove 126, and second passage 130 along an interface 109 between cylinder head 108 and engine block 110 from the combustion that occurs within cylinder 114 and from coolant flowing through various cooling passages 134 formed in engine block 110. Alternatively, an o-ring could be used with a single seal head gasket (not shown) to maintain sealing of the aforementioned passages. First manifold passage 112 and second manifold passage 122 may be in a first plane that is parallel to a second plane that includes annular groove 126, and the first plane is axially offset from the second plane.

One or more passages in cylinder head 108, which may include first longitudinal manifold passage 112, second longitudinal manifold passage 122, transverse WHR passage 116a and transverse WHR passage 116b, are located axially between one or more coolant passages or chambers 136, 138, 140, and 142 formed in cylinder head 108 and a bottom or interface portion of cylinder head 108. By transferring heat from the combustion process that occurs within engine 10, more specifically along interface 109 between cylinder head 108 and engine block 110, into the passages of WHR circuit 18, less heat is transferred to the coolant flowing in coolant passages or chambers 134, 136, 138, 140, and 142. Thus, the heat load on the coolant system of engine 10 from the combustion process is reduced, improving the parasitic load from the coolant system on engine 10 and increasing the efficiency of engine 10. As can be seen from FIG. 4, first manifold passage 112, second manifold passage 122, transverse WHR passage 116a and transverse WHR passage 116b, in addition to being between interface 109 and cooling passages or chambers 136 and 142, may also be located in the bottom portion of cylinder head 108 and may lie within a plane.

During combustion in engine cylinders 114, significant heat is generated near the end of engine cylinders 114 adjacent to cylinder head 108 and in the portion of cylinder head 108 about fuel injector bore 120. Feed pump 54 of WHR system 12 moves working fluid through WHR circuit 18. The working fluid enters cylinder head 108 via first WHR manifold passage 112 formed in cylinder head 108. The working fluid may flow through a plurality of passages formed in various portions of cylinder head 108 and engine block 110 that are located adjacent or proximate to high temperature areas of cylinder head 108 and engine block 110. These passages include one or more WHR passages 116a and 116b that provide working fluid to annular area or portion 118 located adjacent to fuel injector bore 120 and may include first passage 124 that connects to annular groove 126 formed in cylinder liner 128 that connects to second passage 130.

Annular groove 126 is in a portion of cylinder liner 128 subjected to significant heat from the combustion process. The temperature of each of these portions may vaporize the working fluid or may raise the temperature of the liquid working fluid close to a phase change point, depending on the fluid chosen and the amount of heat generated in the aforementioned areas. WHR passage 116a, WHR passage 116b, second passage 130, as well as any other passage formed within engine block 110 or cylinder head 108 that originates with first WHR manifold passage 112 eventually connects to second WHR manifold passage 122. Second WHR manifold passage 122 then carries heated working fluid to WHR circuit 18, where the heated working fluid flows downstream to exhaust heat exchanger 62.

Working fluid may enter and exit the plurality of passages formed in cylinder head 108 through a variety of locations, for example at a first inlet portion 144 and a second inlet portion 146 of first WHR manifold passage 112 and a first outlet portion 148 and a second outlet portion 150 of second WHR manifold passage 122. Working fluid may enter first WHR manifold passage 112 at second inlet portion 148 and exit second WHR manifold passage 122 at second outlet portion 150. Working fluid may also enter first WHR manifold passage 112 at location second inlet portion 146 and exit second WHR manifold passage 122 at first outlet portion 148. Thus, entry and exit into first WHR manifold passage 112 and second WHR manifold passage 122 is flexible.

If the working fluid is incompletely vaporized, downstream exhaust heat exchanger 62 and EGR superheater 58 provide sufficient heat transfer to the working fluid to finish the phase change from a liquid to a gas to provide sufficient energy for energy conversion device 66 to operate efficiently. Such heat exchangers may be for exhaust gas recirculation (EGR) cooling, exhaust gas cooling, and cooling of other temperature sources with sufficient heat capacity to raise the temperature of the liquid working fluid to a vapor or to superheat vaporized working fluid.

There are several options to produce WHR passages 116a and 116b. WHR passages 116a may be drilled from a first side of cylinder head 108 to intersect first WHR manifold passage 112 and WHR passage 116b may be drilled from a second side of cylinder head 108 to intersect second WHR manifold passage 122. The external openings on cylinder head 108 may then be plugged to seal the internal passages. WHR passages 116a and 116b as well as manifolds 112 and 122 may be cast into cylinder head 108 via one of several casting methods, for example lost wax and sand casting.

Figure 6:
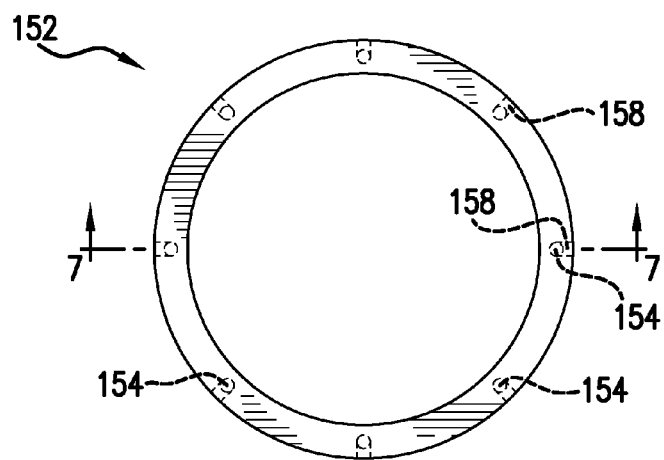
FIG. 6 is a top view of an alternative embodiment cylinder liner of the engine body of FIG. 2.
Figure 7:
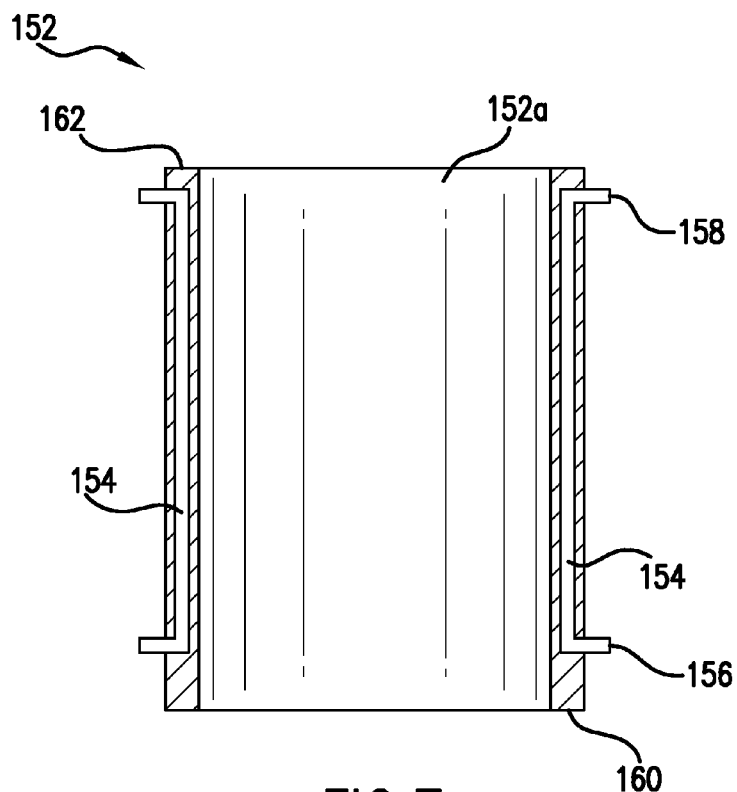
FIG. 7 is a sectional view of the cylinder liner of FIG. 6 along the lines 7-7.

In addition to portions of cylinder head 108 and engine block 110, heat transfer may include other components positioned within or associated with engine block 110 and cylinder 108. For example, working fluid may be routed through a cylinder liner. An alternative embodiment cylinder liner 152 compatible with above-described WHR system 12 is shown in FIGS. 6 and 7. Cylinder liner 152 may have a plurality of axially extending passages 154 formed therein to guide the working fluid along cylinder liner 152. Fluid passages (not shown) formed in engine block 110 that would be similar to the fluid passages formed in cylinder heads 108 above would transport working fluid to a plurality of passage inlets 156 of passages 154 and then connect to a plurality of passage outlets 158 of passages 154 with WHR circuit 18. Such connection may be through second WHR manifold passage 122 or through another connection to the exterior of engine block 110. Axial passages 154 may be drilled and plugged or may be cast into cylinder liner 152. The working fluid enters at passage inlet 156 and exits at passage outlet 158 to gain the maximum heat transference from the interior of cylinder liner 152 during the combustion process. The combustion process typically occurs near a portion 152a of cylinder liner 152, so the working fluid will be subjected to increasing temperature as it travels from the region of cylinder liner 152 adjacent to passage inlet 156 to the region of the cylinder liner adjacent to passage outlet 158. While passage inlets 156 and passage outlets 158 are shown extending perpendicular to axial passage 154, passage inlets 156 may be on a first face 160 of cylinder liner 152 and passage outlets 158 may be on a second face 162 of cylinder liner 152, if the configuration of engine block 110 permits such connection locations.

Figure 8:
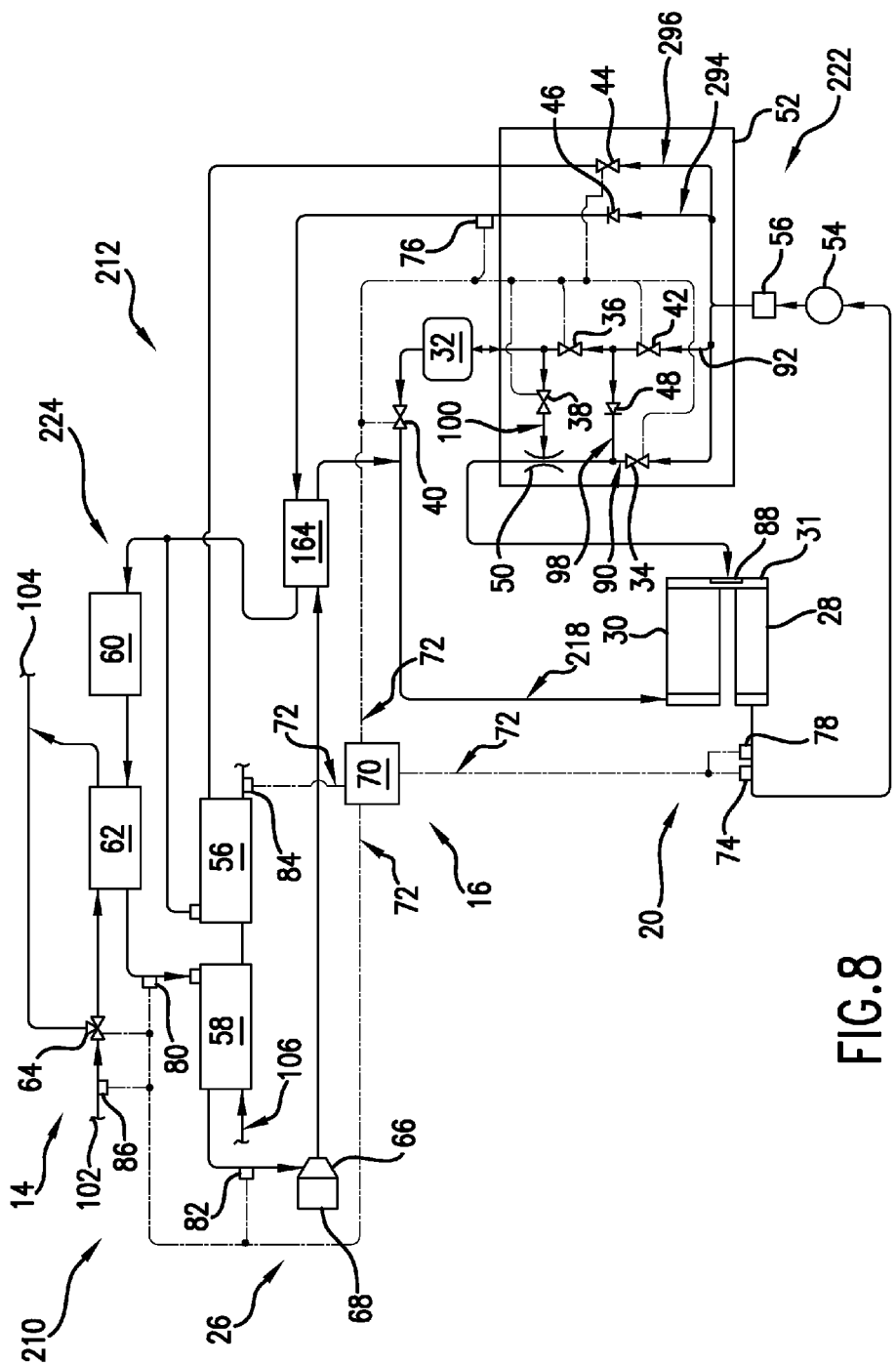
FIG. 8 is a schematic of a second exemplary embodiment of the present disclosure.

Referring now to FIG. 8, an engine 210 in accordance with a second exemplary embodiment of the present disclosure is shown. Engine 210 includes a Rankine cycle waste heat recovery (WHR) system 212, a portion of exhaust system 14, and control system 16. WHR system 212 includes a WHR circuit 218, along which are positioned a fluid management portion 20, a fluid control portion 222, a heat exchange portion 224, and energy conversion portion 26. Fluid management portion 20 provides containment and cooling for the liquid working fluid of WHR system 212. Fluid control portion 222 regulates the flow of the working fluid throughout WHR system 212. Heat exchange portion 224 provides cooling to certain systems of engine 210 and serves to heat the working fluid to permit the working fluid to drive energy conversion portion 26, extracting useful work or energy from waste heat created by engine 210.

Engine 210 includes various features to improve the transfer of heat to WHR system 212. WHR system 212 receives heat directly from an engine body and/or a cylinder head of engine 210. The heat received directly from the engine body and/or the cylinder head is of sufficient quality, i.e., temperature, that the heat is capable of vaporizing the working fluid. Additionally, the placement of the EGR boiler ahead of the engine cooler enables cooling of EGR gases while raising the temperature of the working fluid. The high quality cooling of EGR gas and heating of the working fluid is performed ahead of optional cooling of gas flowing through exhaust system 14. WHR system 212 also includes a novel valve configuration that offers improved ability to control the flow of working fluid throughout WHR system 212.

Fluid management portion 20, exhaust system 14, and energy conversion portion 26 work as described in the first embodiment. As in the previous embodiment, sub-cooler 28 of fluid management portion 20 is upstream from a fluid control portion 222. Fluid control portion 222 includes a plurality of valves and ejector 50 configured to regulate flow as needed throughout WHR system 212. Some of the valves receive signals from control system 16 and others are passive valves. The valves include electrically actuated on-off valves 34, 36, 38, electrically actuated proportional valves 42 and 44, electrically actuated vent valve 40, and passive check valves 46 and 48. Ejector 50 is also a passive device and operates in conjunction with certain valves to draw liquid working fluid from receiver 32. Many of the valves and ejector 50 may be included within valve module 52. The function of the various valves and ejector 50 is to control the flow of working fluid in WHR system 212, which also controls the heat transferred to and from the working fluid flowing through WHR circuit 218. Though electrically actuated valves 34, 36, 38, 40, 42, and 44 may be described as on-off or proportional valves, this description is for convenience in the context of the second exemplary embodiment. The on-off valves may be proportional valves and the proportional valves may be modulated valves capable of opening and closing rapidly to adjust the amount of working fluid flowing through the valves.

Heat exchange portion 224 includes EGR boiler 56, EGR superheater 58, engine heat exchanger 60, exhaust heat exchanger 62, exhaust control valve 64, and a recuperator 164. Recuperator 164 provides the ability to transfer heat from working fluid flowing from energy conversion portion 26 to condenser 30 of fluid management portion 20 to working fluid flowing from fluid control portion 222 to engine heat exchanger 60. EGR boiler 56 provides the ability to regulate the temperature of an EGR gas by transferring heat to the working fluid. Engine heat exchanger 60 is positioned internally within an engine body and/or a cylinder head of engine 210, permitting direct transfer of heat from within the engine body and/or cylinder head to the working fluid. Exhaust heat exchanger 62 permits the controlled transfer of heat from engine exhaust gas to the working fluid. The amount of heat available to exhaust heat exchanger 62 is determined by exhaust control valve 64. EGR superheater 58 provides additional heat energy to the working fluid, which is in a gaseous state when it enters EGR superheater 58.

Control system 16 may include control module 70 and wire harness 72. Control system 16 may also include first pressure sensor 74, which may be used to assist in determining whether sub-cooling of the working fluid in sub-cooler 28 is adequate, and second pressure sensor 76, which is used to measure high side pressure along WHR circuit 218 downstream from feed pump 54 and upstream from engine heat exchanger 60. Second pressure sensor 76 is positioned at the location shown in FIG. 8 because the temperature of the working fluid at that location is significantly lower than at other locations downstream of the various heat exchangers positioned along WHR circuit 218. Keeping second pressure sensor 76 in a cooler location is more suitable for the packaging and durability of second pressure sensor 76. Control system 16 may also include fluid level sensor 88 positioned to measure the level of liquid working fluid in sub-cooler 28 and condenser 30. Control system 16 may use signals from fluid level sensor 88 to determine whether additional liquid working fluid should be added to sub-cooler 28 and condenser 30.

Control system 16 may also include a plurality of temperatures sensors, such as temperature sensors 78, 80, 82, 84 and 86. Signals from first temperature sensor 78 may be used in conjunction with signals from first pressure sensor 74 to assist in determining whether sub-cooling of the working fluid is adequate. Second temperature sensor 80 provides signals to control system 16 that indicates the amount of heat that has been transferred to the working fluid by recuperator 164, engine heat exchanger 60, exhaust heat exchanger 62, and EGR boiler 56. Signals from third temperature sensor 82 in conjunction with signals from second pressure sensor 76 are used to estimate the amount heat that has been transferred to the working fluid from EGR superheater 58, which is an estimate of superheating of the working fluid at the inlet to energy conversion device 66. Control system 16 may use signals indicative of the temperature of the working fluid from second temperature sensor 80 and third temperature sensor 82 to increase or decrease the heat transferred to the working fluid. Fourth temperature sensor 84 provides signals to control system 16 indicative of the temperature of EGR gas exiting EGR boiler 56. Control system 16 may use the signals from fourth temperature sensor 84 to increase or decrease heat transfer to the working fluid to vary cooling of the EGR gas. Signals from fifth temperature sensor 86 to control system 16 indicate the temperature of exhaust gas flowing toward exhaust heat exchanger 62. Control system 16 may use the temperature signals from fifth temperature sensor 86 in conjunction with information from second temperature sensor 80 and third temperature sensor 82 to determine the amount of exhaust gas needed to flow through exhaust heat exchanger 62 to heat the working fluid.

The location of the aforementioned elements is arranged to obtain the benefits of the present disclosure. Condenser 30 is positioned along WHR circuit 218, upstream from sub-cooler 28 and downstream from energy conversion portion 26. As previously noted, condenser 30 may be positioned or located on base plate or common base 31, to which sub-cooler 28 may also be attached. Feed pump 54 is positioned along WHR circuit 218 downstream from sub-cooler 28 and upstream from valve module 52. First pressure sensor 74 and first temperature sensor 78 are positioned along WHR circuit 218 between sub-cooler 28 and feed pump 54. Filter drier 56 may be positioned along WHR circuit 218 downstream from feed pump 54 and upstream from valve module 52 of fluid control portion 222.

Fluid control portion 222 may include a plurality of parallel flow path portions that connect feed pump 54 to various elements of WHR system 12. First flow path portion 90 connects the downstream side of feed pump 54 to sub-cooler 28 and condenser 30. Positioned along first flow path portion 90 downstream from feed pump 54 is on-off valve 34. Downstream from on-off valve 34 is ejector 50.

Second flow path portion 92, which is parallel to first flow path portion 90, connects feed pump 54 to receiver 32. Proportional valve 42 is positioned along second flow path portion 92 downstream from feed pump 54. On-off valve 36 is positioned along second flow path portion 92 between proportional valve 42 and receiver 32. Second flow path portion 92 is connected to first flow path portion 90 along a first connection portion 98 and a second connection portion 100. Passive check valve 48 is positioned along first connection portion 98, which connects to second flow path portion 92 in a location between proportional valve 42 and on-off valve 36, and which connects to first flow path portion 90 in a location between on-off valve 34 and ejector 50. On-off valve 38 is positioned along second connection portion 100, which connects to second flow path portion 92 in a location between on-off valve 36 and receiver 32, and which connects to ejector 50, positioned along first flow path portion 90. Though not part of second flow path portion 92, vent valve 40 is positioned along WHR circuit 218 between receiver 32 and condenser 30. The purpose of vent valve 40 is to permit vapor to move into and out from receiver 32 as liquid working fluid is moved out from and into receiver 32 along second flow path portion 92.

A third flow path portion 294, which is parallel to first flow path portion 90 and to second flow path portion 92, connects feed pump 54 to recuperator 164. Passive check valve 46 is positioned along third flow path portion 294, between feed pump 54 and recuperator 164. Recuperator 164 is connected on a downstream side to engine heat exchanger 60, and is therefore positioned upstream from engine heat exchanger 60. Second pressure sensor 76 is positioned along third flow path portion 294 between passive check valve 46 and recuperator 164.

A fourth flow path portion 296, which is parallel to first flow path 90, second flow path portion 92, and third flow path portion 294, connects feed pump 54 to EGR boiler 56. Proportional valve 44 is positioned along fourth flow path portion 296 downstream from feed pump 54 and upstream from EGR boiler 56. EGR boiler 56 is connected on a downstream side to engine heat exchanger 60, and is therefore positioned upstream from engine heat exchanger 60. Because engine heat exchanger 60 is connected to EGR boiler 56 downstream from EGR boiler 56, fourth flow path 296 converges with third flow path portion 294.

The positions of components downstream from engine heat exchanger 60 are as described in the first exemplary embodiment hereinabove.

WHR system 212 operates as follows. Sub-cooler 28 stores liquid working fluid. An engine 210 belt (not shown), crankshaft (not shown), gear drive with a clutch connection (not shown), or an electric motor (not shown) drives feed pump 54. Feed pump 54 pulls or draws liquid working fluid from sub-cooler 28. Feed pump 54 then forces liquid working fluid downstream to valve module 52. In valve module 52, the flow of liquid working fluid may be directed to one of four parallel flow path portions, as directed by control system 16 by way of the valves in valve module 52. First flow path portion 90 connects feed pump 54 to sub-cooler 28. Second flow path portion 92 connects feed pump 54 to receiver 32. Third flow path portion 294 connects feed pump 54 to recuperator 164. Fourth flow path portion 296 connects feed pump 54 to EGR boiler 56.

Liquid working fluid flows along first flow path portion 90 and second flow path 92 as described in the first exemplary embodiment of the present disclosure.

Liquid working fluid flows along third flow path portion 294 based on the opening of proportional valve 44 positioned along fourth flow path portion 296. Passive check valve 46 creates a backpressure along the upstream portion of third flow path portion 94, which biases the flow of liquid working fluid along fourth flow path portion 296. By partially closing proportional valve 44, the backpressure along the upstream portion of fourth flow path portion 296 increases, until passive check valve 46 cracks or opens under the increased backpressure from proportional valve 44. Relatively small amounts of liquid working fluid normally flow through first flow path portion 90 and second flow path portion 92, so most of the liquid working fluid provided to WHR circuit 218 by feed pump 54 flows through third flow path portion 294 and fourth flow path portion 296.

Control system 16 receives signals from second temperature sensor 80 indicative of the temperature of the working fluid prior to entering EGR superheater 58. If the temperature of the working fluid is insufficient for a desired level of superheating by EGR superheater 58, control system 16 may send a control signal to proportional valve 44 to decrease flow through fourth flow path portion 296, which increases flow through third flow path portion 294 to recuperator 164. The increase in the flow of working fluid through recuperator 164 causes an increase in heat transfer from EGR system 106 to the working fluid. Control system 16 may also receive temperature signals from third temperature sensor 82 indicative of the amount of superheating of the working fluid, which control system 16 may use to adjust the flow of liquid working fluid through third flow path portion 294 and fourth flow path portion 296. Control system 16 may also receive temperature signals from fourth temperature sensor 84 indicative of the temperature of EGR gas. Because cooling of EGR gas in EGR circuit 106 relates to emissions of engine 210, control system 16 may increase or decrease flow of working fluid through fourth flow path portion 296 to increase or decrease cooling of EGR gas to optimize engine emissions.

Flow of working fluid through third flow path portion 294 and the fourth flow path portion 296 converges upstream from engine heat exchanger 60. At engine heat exchanger 60, heat is transferred directly from an engine body and/or an engine cylinder head directly to the working fluid, as described in more detail in the first exemplary embodiment of the present disclosure. From engine heat exchanger 60, the working fluid flows to exhaust heat exchanger 62. Control system 16 is able to direct heat to exhaust heat exchanger 62 by sending control signals to exhaust control valve 64, depending on the temperature signals control system 16 receives from second temperature sensor 80 and third temperature sensor 82, and the temperature of exhaust gases, which is indicated by signals from fifth temperature sensor 86. Any exhaust gas that does not flow into exhaust heat exchanger 62 flows around exhaust heat exchanger 62 directly to atmospheric vent 104.

The working fluid, which is in a gaseous state because of heat transfer from the above-described heat exchangers, flows into EGR superheater 58, where additional heat energy is added to the gaseous working fluid. The superheated gaseous working fluid flows into energy conversion device 66.

The placement of engine heat exchanger 60 is beneficial from a thermodynamic cycle perspective. The heat from engine heat exchanger 60 is of sufficient quality or temperature to convert the working fluid to vapor while performing a necessary engine function, the cooling of the engine body and/or the cylinder head. Cooling of exhaust gas in exhaust heat exchanger 62 is an optional function that may be reduced in favor of cooling EGR gas in EGR boiler 56 and cooling of engine 210 in engine heat exchanger 60. Thus, the configuration of these components is advantageous in providing priority cooling to EGR gas, then the engine body and/or cylinder head in engine heat exchanger 60. Additional heat may then be added as needed in exhaust heat exchanger 62 and EGR superheater 58 by WHR system 212 to obtain optimal superheating of the working fluid.

High-pressure energy conversion device 66 may drive auxiliary unit 68. Auxiliary unit 68 can channel mechanical energy into the driveline (not shown) of engine 210 or can generate electrical energy to power electrical devices or for storage in one or more batteries. If auxiliary unit 68 is an electrical generator, the power could power a driveline motor generator (not shown) by way of power electronics (not shown) to help drive a vehicle (not shown) in which engine 210 is mounted. As the superheated gaseous working fluid flows through energy conversion device 66, the pressure and temperature of the gaseous working fluid decreases significantly prior to flowing into condenser 30. The decrease in temperature and pressure begin the condensation process. The mixture of liquid and gaseous working fluid flows to recuperator 164, where heat is transferred from the hot working fluid to relatively cool working fluid flowing from feed pump 54 to engine heat exchanger 60. The working fluid then flows to condenser 30, where the condensation process is completed. The working fluid, now in a liquid state, flows to sub-cooler 28, and the process begins again.

Figure 9:
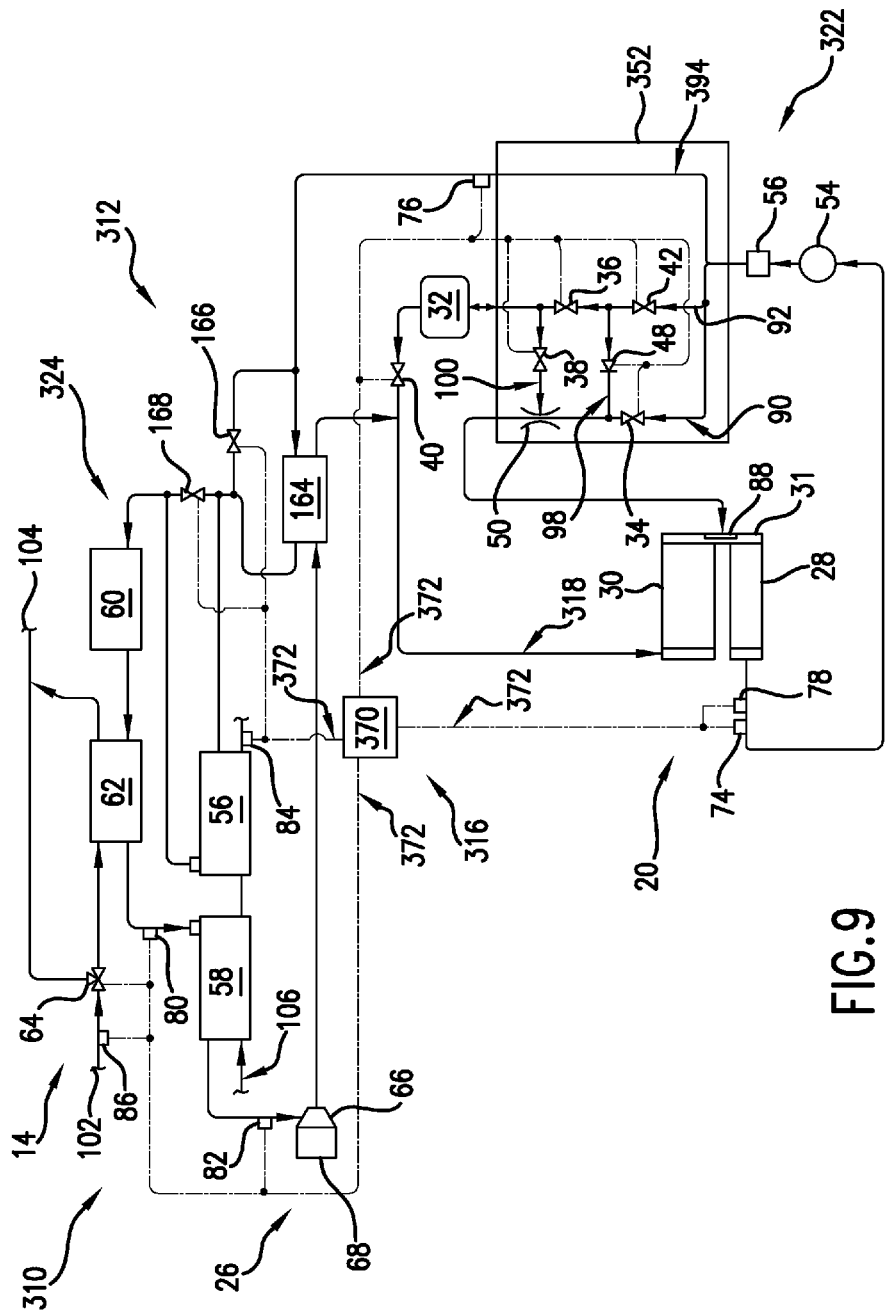
FIG. 9 is a schematic of a third exemplary embodiment of the present disclosure.

Referring now to FIG. 9, an engine 310 in accordance with a third exemplary embodiment of the present disclosure is shown. Engine 310 includes a Rankine cycle waste heat recovery (WHR) system 312, a portion of exhaust system 14, and a control system 316. WHR system 312 includes a WHR circuit 318, along which are positioned fluid management portion 20, a fluid control portion 322, a heat exchange portion 324, and energy conversion portion 26. Fluid management portion 20 provides containment and cooling for the liquid working fluid of WHR system 312. Fluid control portion 322 regulates the flow of the working fluid throughout WHR system 312. Heat exchange portion 324 provides cooling to certain systems of engine 310 and serves to heat the working fluid to permit the working fluid to drive energy conversion portion 26, extracting useful work or energy from waste heat created by engine 310.

Engine 310 includes various features to improve the transfer of heat to WHR system 312. WHR system 312 receives heat directly from an engine body and/or a cylinder head of engine 310. The heat received directly from the engine body and/or the cylinder head is of sufficient quality, i.e., temperature, that the heat is capable of vaporizing the working fluid. Additionally, the placement of the EGR boiler ahead of the engine cooler enables cooling of EGR gases while raising the temperature of the working fluid. The high quality cooling of EGR gas and heating of the working fluid is performed ahead of optional cooling of gas flowing through exhaust system 14. WHR system 312 also includes a novel valve configuration that offers improved ability to control the flow of working fluid throughout WHR system 312.

Fluid management portion 20, exhaust system 14, and energy conversion portion 26 work as described in the first embodiment. As in the previous embodiment, a sub-cooler 28 of fluid management portion 20 is upstream from fluid control portion 322. Fluid control portion 322 includes a plurality of valves and ejector 50 configured to regulate flow as needed throughout WHR system 312. Some of the valves receive signals from control system 316 and others are passive valves. The valves include electrically actuated on-off valves 34, 36, 38, electrically actuated proportional valves 42, 44, an optional recuperator bypass valve 166, and an EGR bypass valve 168, electrically actuated vent valve 40, and passive check valve 48. Ejector 50 is also a passive device and operates in conjunction with certain valves to draw liquid working fluid from receiver 32. Many of the valves and ejector 50 may be included within a valve module 352. The function of the various valves and ejector 50 is to control the flow of working fluid in WHR system 312, which also controls the heat transferred to and from the working fluid flowing through WHR circuit 318. Though electrically actuated valves 34, 36, 38, 40, 42, 44, 166, and 168 may be described as on-off or proportional valves, this description is for convenience in the context of the third exemplary embodiment. The on-off valves may be proportional valves and the proportional valves may be modulated valves capable of opening and closing rapidly to adjust the amount of working fluid flowing through the valves.

Heat exchange portion 324 includes EGR boiler 56, EGR superheater 58, engine heat exchanger 60, exhaust heat exchanger 62, exhaust control valve 64, and recuperator 164. Recuperator 164 provides the ability to transfer heat from working fluid flowing from energy conversion portion 26 to condenser 30 of fluid management portion 20 to working fluid flowing from fluid control portion 322 to engine heat exchanger 60. EGR boiler 56 provides the ability to regulate the temperature of an EGR gas by transferring heat to the working fluid. Engine heat exchanger 60 is positioned internally within an engine body and/or a cylinder head of engine 310, permitting direct transfer of heat from within the engine body and/or cylinder head to the working fluid. Exhaust heat exchanger 62 permits the controlled transfer of heat from engine exhaust gas to the working fluid. The amount of heat available to exhaust heat exchanger 62 is determined by exhaust control valve 64. EGR superheater 58 provides additional heat energy to the working fluid, which is in a gaseous state when it enters EGR superheater 58.

Control system 316 may include a control module 370 and a wire harness 372. Control system 316 may also include first pressure sensor 74, which may be used to assist in determining whether sub-cooling of the working fluid in sub-cooler 28 is adequate, and second pressure sensor 76, which is used to measure high side pressure along WHR circuit 18 downstream from feed pump 54 and upstream from engine heat exchanger 60. Second pressure sensor 76 is positioned at the location shown in FIG. 9 because the temperature of the working fluid at that location is significantly lower than at other locations downstream of the various heat exchangers positioned along WHR circuit 18. Keeping second pressure sensor 76 in a cooler location is more suitable for the packaging and durability of second pressure sensor 76. Control system 316 may also include fluid level sensor 88 positioned to measure the level of liquid working fluid in sub-cooler 28 and condenser 30. Control system 316 may use signals from fluid level sensor 88 to determine whether additional liquid working fluid should be added to sub-cooler 28 and condenser 30.

Control system 316 may also include a plurality of temperatures sensors, such as temperature sensors 78, 80, 82, 84 and 86. Signals from first temperature sensor 78 may be used in conjunction with signals from first pressure sensor 74 to assist in determining whether sub-cooling of the working fluid is adequate. Second temperature sensor 80 provides signals to control system 316 that indicates the amount of heat that has been transferred to the working fluid by recuperator 164, engine heat exchanger 60, exhaust heat exchanger 62, and EGR boiler 56. Signals from third temperature sensor 82 in conjunction with signals from second pressure sensor 76 are used to estimate the amount heat that has been transferred to the working fluid from EGR superheater 58, which is an estimate of superheating of the working fluid at the inlet to energy conversion device 66. Control system 316 may use signals indicative of the temperature of the working fluid from second temperature sensor 80 and third temperature sensor 82 to increase or decrease the heat transferred to the working fluid. Fourth temperature sensor 84 provides signals to control system 316 indicative of the temperature of EGR gas exiting EGR boiler 56. Control system 316 may use the signals from fourth temperature sensor 84 to increase or decrease heat transfer to the working fluid to vary cooling of the EGR gas. Signals from fifth temperature sensor 86 to control system 316 indicate the temperature of exhaust gas flowing toward exhaust heat exchanger 62. Control system 316 may use the temperature signals from fifth temperature sensor 86 in conjunction with information from second temperature sensor 80 and third temperature sensor 82 to determine the amount of exhaust gas needed to flow through exhaust heat exchanger 62 to heat the working fluid.

The location of the aforementioned elements is arranged to obtain the benefits of the present disclosure. Condenser 30 is positioned along WHR circuit 318, upstream from sub-cooler 28 and downstream from energy conversion portion 26. As previously noted, condenser 30 may be positioned or located on base plate or common base 31, to which sub-cooler 28 may also be attached. Feed pump 54 is positioned along WHR circuit 318 downstream from sub-cooler 28 and upstream from valve module 352. First pressure sensor 74 and first temperature sensor 78 are positioned along WHR circuit 318 between sub-cooler 28 and feed pump 54. Filter drier 56 may be positioned along WHR circuit 318 downstream from feed pump 54 and upstream from valve module 352 of fluid control portion 322.

Fluid control portion 322 may include a plurality of parallel flow path portions that connect feed pump 54 to various elements of WHR system 312. First flow path portion 90 connects the downstream side of feed pump 54 to sub-cooler 28 and condenser 30. Positioned along first flow path portion 90 downstream from feed pump 54 is on-off valve 34. Downstream from on-off valve 34 is ejector 50.

Second flow path portion 392, which is parallel to first flow path portion 90, connects feed pump 54 to receiver 32. Proportional valve 42 is positioned along second flow path portion 92 downstream from feed pump 54. On-off valve 36 is positioned along second flow path portion 92 between proportional valve 42 and receiver 32. Second flow path portion 92 is connected to first flow path portion 90 along first connection portion 98 and second connection portion 100. Passive check valve 48 is positioned along first connection portion 98, which connects to second flow path portion 92 in a location between proportional valve 42 and on-off valve 36, and which connects to first flow path portion 90 in a location between on-off valve 34 and ejector 50. On-off valve 38 is positioned along second connection portion 100, which connects to second flow path portion 92 in a location between on-off valve 36 and receiver 32, and which connects to ejector 50, positioned along first flow path portion 90. Though not part of second flow path portion 92, vent valve 40 is positioned along WHR circuit 318 between receiver 32 and condenser 30. The purpose of vent valve 40 is to permit vapor to move into and out from receiver 32 as liquid working fluid is moved out from and into receiver 32 along second flow path portion 92.

A third flow path portion 394, which is parallel to first flow path portion 90 and to second flow path portion 92, connects feed pump 54 to recuperator 164, to EGR boiler 56 by way of optional recuperator bypass valve 166, and to engine heat exchanger 60 by way of EGR boiler bypass valve 168. Recuperator 164 is connected on a downstream side to engine heat exchanger 60, and is therefore positioned upstream from engine heat exchanger 60. Second pressure sensor 76 is positioned along third flow path portion 294 upstream from recuperator 164.

The positions of components downstream from engine heat exchanger 60 are as described in the first exemplary embodiment hereinabove.

WHR system 312 operates as follows. Sub-cooler 28 stores liquid working fluid. An engine 310 belt (not shown), crankshaft (not shown), gear drive with a clutch connection (not shown), or an electric motor (not shown) drives feed pump 54. Feed pump 54 pulls or draws liquid working fluid from sub-cooler 28. Feed pump 54 then forces liquid working fluid downstream to valve module 352. In valve module 352, the flow of liquid working fluid may be directed to one of three parallel flow path portions, as directed by control system 316 by way of the valves in valve module 352. First flow path portion 90 connects feed pump 54 to sub-cooler 28. Second flow path portion 92 connects feed pump 54 to receiver 32. Third flow path portion 394 connects feed pump 54 to recuperator 164, or to EGR boiler 56 by way of recuperator bypass valve 166, or to engine heat exchanger 60 by way of EGR boiler bypass valve 168. Because of the position of optional recuperator bypass valve 166 and EGR boiler bypass valve 168, control system 316 is able to send working fluid directly from feed pump 54 to engine heat exchanger 60, to recuperator 164 and then to engine heat exchanger 60. Note that optional recuperator bypass valve 166 may also be used with the configuration of FIG. 8. Feed pump 54 may also connect to EGR boiler 56 along a portion of WHR circuit 318 that is parallel to EGR boiler bypass valve 168 and then to engine heat exchanger 60. Control system 316 may also connect feed pump 54 to recuperator 164, EGR boiler 56, as described above, and then to engine heat exchanger 60. Thus, the various configurations of the valves of WHR system 312 provide significant flexibility in heat transfer from various portions of engine 310 to the working fluid.

Liquid working fluid flows along first flow path portion 90 and second flow path 92 as described in the first exemplary embodiment of the present disclosure. Relatively small amounts of liquid working fluid normally flow through first flow path portion 90 and second flow path portion 92, so most of the liquid working fluid provided to WHR circuit 318 by feed pump 54 flows through third flow path portion 394.

Control system 316 receives signals from second temperature sensor 80 indicative of the temperature of the working fluid prior to entering EGR superheater 58. If the temperature of the working fluid is insufficient for a desired level of superheating by EGR superheater 58, control system 316 may send a control signal to optional recuperator bypass valve 166 to increase flow of working fluid through recuperator 164. Control system 316 may also send a control signal to EGR bypass valve 168 to increase flow of working fluid through EGR boiler 56, which is along a portion of WHR circuit 318 that is in parallel to EGR bypass valve 168. The increase in the flow of working fluid through recuperator 164 causes an increase in heat transfer from working fluid flowing from energy conversion portion 26 to condenser 30 of fluid management portion 20. The increase in the flow of working fluid through EGR boiler 56 causes an increase in heat transfer from EGR system 106 to the working fluid. Control system 316 may also receive temperature signals from third temperature sensor 82 indicative of the amount of superheating of the working fluid, which control system 316 may use to adjust the flow of liquid working fluid through third flow path portion 394. Control system 316 may also receive temperature signals from fourth temperature sensor 84 indicative of the temperature of EGR gas. Because cooling of EGR gas in EGR circuit 106 relates to emissions of engine 310, control system 316 may increase or decrease flow of working fluid through recuperator 164 to increase or decrease cooling of EGR gas to optimize engine emissions.

At engine heat exchanger 60, heat is transferred directly from an engine body and/or an engine cylinder head directly to the working fluid, as described in more detail in the first exemplary embodiment of the present disclosure. From engine heat exchanger 60, the working fluid flows to exhaust heat exchanger 62. Control system 316 is able to direct heat to exhaust heat exchanger 62 by sending control signals to exhaust control valve 64, depending on the temperature signals control system 316 receives from second temperature sensor 80 and third temperature sensor 82, and the temperature of exhaust gases, which is indicated by signals from fifth temperature sensor 86. Any exhaust gas that does not flow into exhaust heat exchanger 62 flows around exhaust heat exchanger 62 directly to atmospheric vent 104.

The working fluid, which is in a gaseous state because of heat transfer from the above-described heat exchangers, flows into EGR superheater 58, where additional heat energy is added to the gaseous working fluid. The superheated gaseous working fluid flows into energy conversion device 66.

The placement of engine heat exchanger 60 is beneficial from a thermodynamic cycle perspective. The heat from engine heat exchanger 60 is of sufficient quality or temperature to convert the working fluid to vapor while performing a necessary engine function, the cooling of the engine body and/or the cylinder head. Cooling of exhaust gas in exhaust heat exchanger 62 is an optional function that may be reduced in favor of cooling EGR gas in EGR boiler 56 and cooling of engine 310 in engine heat exchanger 60. Additionally, cooling of working fluid flowing from energy conversion portion 26 to condenser 30 of fluid management portion 20 is an optional function that may also be reduced in favor of cooling EGR gas in EGR boiler 56 and cooling of engine 310 in engine heat exchanger 60. Thus, the configuration of these components is advantageous in providing priority cooling to EGR gas, then the engine body and/or cylinder head in engine heat exchanger 60. Additional heat may then be added as needed in recuperator 164, exhaust heat exchanger 62 and EGR superheater 58 by WHR system 312 to obtain optimal superheating of the working fluid.

High-pressure energy conversion device 66 may drive auxiliary unit 68. Auxiliary unit 68 can channel mechanical energy into the driveline (not shown) of engine 310 or can generate electrical energy to power electrical devices or for storage in one or more batteries. If auxiliary unit 68 is an electrical generator, the power could power a driveline motor generator (not shown) by way of power electronics (not shown) to help drive a vehicle (not shown) in which engine 310 is mounted. As the superheated gaseous working fluid flows through energy conversion device 66, the pressure and temperature of the gaseous working fluid decreases significantly prior to flowing into condenser 30. The decrease in temperature and pressure begin the condensation process. The mixture of liquid and gaseous working fluid flows to recuperator 164, where heat is optionally transferred from the hot working fluid to relatively cool working fluid flowing from feed pump 54 to engine heat exchanger 60. The working fluid then flows to condenser 30, where the condensation process is completed. The working fluid, now in a liquid state, flows to sub-cooler 28, and the process begins again.

Many aspects of the disclosure are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions (software), such as program modules, being executed by one or more processors, or by a combination of both. Moreover, the disclosure can additionally be considered to be embodied within any form of computer readable carrier, such as solid-state memory, magnetic disk, and optical disk containing an appropriate set of computer instructions, such as program modules, and data structures that would cause a processor to carry out the techniques described herein. A computer-readable medium may include the following: an electrical connection having one or more wires, magnetic disk storage, magnetic cassettes, magnetic tape or other magnetic storage devices, a portable computer diskette, a random access memory (RAM), a read-only memory (ROM), an erasable programmable read-only memory (EPROM or Flash memory), or any other medium capable of storing information. It should be noted that the system of the present disclosure is illustrated and discussed herein as having various modules and units that perform particular functions. It should be understood that these modules and units are merely schematically illustrated based on their function for clarity purposes, and do not necessarily represent specific hardware or software. In this regard, these modules, units and other components may be hardware and/or software implemented to substantially perform their particular functions explained herein. The various functions of the different components can be combined or segregated as hardware and/or software modules in any manner, and can be useful separately or in combination. Thus, the various aspects of the disclosure may be embodied in many different forms, and all such forms are contemplated to be within the scope of the disclosure.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

We claim:

1. An internal combustion engine, comprising:
an engine block;
a cylinder head attached to the engine block; and
a waste heat recovery system including:
a waste heat recovery circuit containing a working fluid, the waste heat recovery circuit including a plurality of waste heat recovery passages formed in at least one of the cylinder head and the engine block,
a pump positioned along the waste heat recovery circuit upstream from the plurality of waste heat recovery passages to deliver the working fluid through the waste heat recovery circuit,
an exhaust gas recirculation (EGR) boiler positioned along the waste heat recovery circuit downstream from the pump so as to selectively receive at least a portion of the working fluid,
an engine heat exchanger positioned along the waste heat recovery circuit downstream from the plurality of waste heat recovery passages to receive at least a portion of the working fluid from the upstream EGR boiler and receive at least a portion of the working fluid from the upstream pump,
an exhaust heat exchanger positioned along the waste heat recovery circuit downstream from the engine heat exchanger so as to receive the working fluid from the upstream engine heat exchanger, the exhaust heat exchanger further selectively receiving an exhaust gas flowing through an exhaust system to an atmospheric vent,
an EGR superheater positioned along the waste heat recovery circuit downstream from the exhaust heat exchanger to receive the working fluid from the upstream exhaust heat exchanger, wherein the EGR boiler and the EGR superheater are connected to at least a portion of an EGR circuit to receive EGR gas, the EGR gas flowing from the EGR superheater into the EGR boiler to transfer heat to the working fluid, and
an energy conversion portion positioned along the waste heat recovery circuit downstream from the plurality of waste heat recovery passages to receive the working fluid.

2. The internal combustion engine of claim 1, including a sub-cooler containing a working fluid positioned along the waste heat recovery circuit upstream from the pump and downstream from the EGR superheater.

3. The internal combustion engine of claim 2, including a receiver, and a plurality of valves having a first valve configuration and a second valve configuration, the receiver and the sub-cooler being positioned along parallel portions of the waste heat recovery circuit downstream from the pump in the first valve configuration, and the receiver and the pump being positioned along parallel portions of the waste heat recovery circuit upstream from the sub-cooler in the second valve configuration.

4. The internal combustion engine of claim 3, including a control system connected to the plurality of valves and adapted to send control signals to the plurality of valves to place the plurality of valves in the first configuration and the second configuration.

5. The internal combustion engine of claim 2, including a condenser positioned along the waste heat recovery circuit upstream from the sub-cooler, and a recuperator positioned along the waste heat recovery circuit between the pump and the exhaust heat exchanger, and the recuperator is positioned along the waste heat recovery circuit downstream from the EGR superheater and upstream from the condenser.

6. The internal combustion engine of claim 1, the waste heat recovery circuit including a first circuit portion connecting the pump to the exhaust heat exchanger, a second circuit portion connecting the pump to the engine heat exchanger, and an EGR boiler positioned along the second circuit portion.

7. A waste heat recovery system for an internal combustion engine, comprising:
   a waste heat recovery circuit;
   a sub-cooler positioned along the waste heat recovery circuit and adapted to hold a working fluid;
   a pump positioned along the waste heat recovery circuit downstream from the sub-cooler to deliver the working fluid through the waste heat recovery circuit;
   an engine body including an engine heat exchanger positioned along the waste heat recovery circuit downstream from the pump;
   an exhaust heat exchanger positioned along the waste heat recovery circuit downstream from the engine heat exchanger to selectively receive an exhaust gas flowing through an exhaust system to an atmospheric vent;
   a recuperator positioned along the waste heat recovery circuit downstream from the pump and upstream from the engine heat exchanger;
   an EGR system coupled to the engine body;
   an EGR superheater positioned along the waste heat recovery circuit downstream from the exhaust heat exchanger so as to receive the liquid working fluid from the exhaust heat exchanger, the EGR superheater coupled to the EGR system so as to receive EGR gas from the EGR system; and
   an EGR boiler positioned along the waste heat recovery circuit upstream from the engine heat exchanger and downstream from the recuperator so as to receive at least a portion of the working fluid from at,least one of the pump and the recuperator, the EGR boiler positioned downstream of the EGR superheater in an EGR circuit so as to receive the EGR gas from the EGR superheater.

8. The waste heat recovery system of claim 7, the recuperator connected to the engine heat exchanger through an EGR boiler bypass valve, and an EGR boiler is positioned along a parallel portion of the waste heat recovery circuit to the EGR boiler bypass valve.

9. The waste heat recovery system of claim 7, including a receiver, and a plurality of valves having a first valve configuration and a second valve configuration, the receiver and the sub-cooler being positioned along parallel portions of the waste heat recovery circuit downstream from the pump in the first valve configuration, and the receiver and the pump being positioned along parallel portions of the waste heat recovery circuit upstream from the sub-cooler in the second valve configuration.

10. The waste heat recovery system of claim 9, including a control system connected to the plurality of valves and adapted to send control signals to the plurality of valves to place the plurality of valves in the first configuration and the second configuration.

11. The waste heat recovery system of claim 7, including a recuperator bypass valve positioned along the waste heat recovery circuit in parallel to the recuperator.

12. A waste heat recovery system for an internal combustion engine, comprising:
   a sub-cooler containing a working fluid;
   a receiver;
   an EGR boiler;
   an engine body including an engine heat exchanger;
   a waste heat recovery circuit including a first flow path portion, a second flow path portion, a third flow path portion, and a fourth flow path portion;
   a pump positioned along the waste heat recovery circuit downstream from the sub-cooler to deliver the working fluid through the waste heat recovery circuit;
   a valve mechanism operable to connect the pump to the sub-cooler along the first flow path portion, to connect the pump to the receiver along the second flow path portion, to connect the pump to the EGR boiler along the third flow path portion, and to connect the pump to the engine heat exchanger along the fourth flow path portion;
   an EGR system coupled to the engine body; and
   an EGR superheater positioned downstream from the engine heat exchanger so as to receive the liquid working fluid from the engine heat exchanger, the EGR superheater coupled to the EGR system so as to receive EGR gas from the EGR system,
   wherein the EGR boiler is positioned upstream from the engine heat exchanger and downstream from the pump so as to receive at least a portion of the working fluid, the EGR boiler positioned downstream of the EGR superheater in an EGR circuit so as to receive the EGR gas from the EGR superheater.

13. The waste heat recovery system of claim 12, the valve mechanism including an ejector positioned along the first flow path portion downstream from the pump and upstream from the sub-cooler.

14. The waste heat recovery system of claim 13, including a connection portion extending from the second flow path portion to the ejector and a controllable valve positioned along the connection portion.

15. The waste heat recovery system of claim 12, including a recuperator positioned along the waste heat recovery circuit downstream from the pump and upstream from the engine heat exchanger.

16. The waste heat recovery system of claim 12, including a control system connected to a plurality of valves positioned along the waste heat recovery circuit and adapted to send control signals to the plurality of valves to control fluid flow along the first flow path portion, the second flow path portion, the third flow path portion, and the fourth flow path portion.

17. The waste heat recovery system of claim 16, including a plurality of temperature sensors adapted to send signals to the control system, wherein the control system send control signals to the plurality of valves based on the signals from the temperature sensors.

* * * * *